United States Patent
Matsuo et al.

(10) Patent No.: US 11,089,270 B2
(45) Date of Patent: Aug. 10, 2021

(54) SOLID-STATE IMAGING DEVICE AND IMAGING DEVICE INCLUDING THE SAME

(71) Applicant: Panasonic Intellectual Property Management Co., Ltd., Osaka (JP)

(72) Inventors: Junichi Matsuo, Osaka (JP); Sei Suzuki, Osaka (JP)

(73) Assignee: NUVOTON TECHNOLOGY CORPORATION JAPAN, Kyoto (JP)

(*) Notice: Subject to any disclaimer, the term of this patent is extended or adjusted under 35 U.S.C. 154(b) by 0 days.

(21) Appl. No.: 16/813,482

(22) Filed: Mar. 9, 2020

(65) Prior Publication Data
US 2020/0213550 A1 Jul. 2, 2020

Related U.S. Application Data

(63) Continuation of application No. PCT/JP2018/029875, filed on Aug. 9, 2018.

(30) Foreign Application Priority Data

Sep. 14, 2017 (JP) .............................. JP2017-177063

(51) Int. Cl.
*H04N 9/04* (2006.01)
*H04N 5/235* (2006.01)
(Continued)

(52) U.S. Cl.
CPC ....... *H04N 9/04553* (2018.08); *G01S 17/894* (2020.01); *H04N 5/2353* (2013.01);
(Continued)

(58) Field of Classification Search
CPC ............ H04N 9/04553; H04N 5/2353; H04N 5/37455; H04N 5/37457; H04N 5/378;
(Continued)

(56) References Cited

U.S. PATENT DOCUMENTS

| 9,923,005 B2* | 3/2018 | Ishiwata | ................ H04N 5/369 |
| 2005/0224842 A1* | 10/2005 | Toyama | ........... H01L 27/14831 |
| | | | 257/225 |

(Continued)

FOREIGN PATENT DOCUMENTS

JP  2013-175783 A  9/2013

OTHER PUBLICATIONS

International Search Report issued in corresponding International Patent Application No. PCT/JP2018/029875, dated Nov. 6, 2018, with English translation.

*Primary Examiner* — Nhan T Tran
(74) *Attorney, Agent, or Firm* — McDermott Will & Emery LLP

(57) ABSTRACT

A solid-state imaging device includes pixels arranged in matrix form, each including a photoelectric converter and first transfer electrodes, and control lines connected to mutually-corresponding ones of the first transfer electrodes in pixels arranged in a specific row. The pixels include first pixels that receive visible light and second pixels that receive infrared light. Each of floating diffusion layer-including pixels, which are some of the plurality of pixels, further includes a floating diffusion layer and a readout circuit. Each floating diffusion layer-lacking pixel shares the floating diffusion layer with one of the first pixels arranged in a column direction. At least some of the control lines are further connected to the first transfer electrodes of pixels arranged adjacent in the column direction to respective ones of the pixels arranged in the specific row and that share at least one of the floating diffusion layers.

9 Claims, 36 Drawing Sheets

(51) Int. Cl.
*H04N 5/3745* (2011.01)
*H04N 5/378* (2011.01)
*G01S 17/894* (2020.01)

(52) U.S. Cl.
CPC ......... *H04N 5/378* (2013.01); *H04N 5/37455* (2013.01); *H04N 5/37457* (2013.01)

(58) Field of Classification Search
CPC .. H04N 5/332; H04N 5/37452; G01S 17/894; G01S 7/4863; G01S 7/4865
See application file for complete search history.

(56) References Cited

U.S. PATENT DOCUMENTS

| | | | | |
|---|---|---|---|---|
| 2007/0030372 | A1* | 2/2007 | Inagaki | H04N 5/3741 |
| | | | | 348/308 |
| 2007/0158713 | A1* | 7/2007 | Ohkawa | H01L 27/14689 |
| | | | | 257/292 |
| 2011/0181747 | A1* | 7/2011 | Kido | H01L 27/14614 |
| | | | | 348/222.1 |
| 2012/0026370 | A1* | 2/2012 | Oike | H04N 5/37457 |
| | | | | 348/298 |
| 2017/0115395 | A1* | 4/2017 | Grauer | H04N 5/35536 |
| 2018/0359434 | A1* | 12/2018 | Tanaka | G02B 5/20 |
| 2019/0206917 | A1* | 7/2019 | Nakajiki | H01L 27/14689 |
| 2020/0120300 | A1* | 4/2020 | Sano | H01L 27/14621 |

* cited by examiner ical Field

The present disclosure relates to a solid-state imaging device that obtains an image of a subject.

2. Description of the Related Art

A solid-state imaging device that obtains an image of a subject by receiving light from the subject has been known for some time (e.g., see Japanese Unexamined Patent Application Publication No. 2013-175783).

SUMMARY

To increase the sensitivity characteristics in a solid-state imaging device, it is desirable to increase the ratio of the area of openings for taking in light in a pixel to the area of the pixel.

Accordingly, the present disclosure provides a solid-state imaging device and an imaging device that can increase the ratio of an opening in a pixel to the area of the pixel.

A solid-state imaging device according to one aspect of the present disclosure includes a plurality of pixels and a plurality of control lines. The plurality of pixels are arranged in matrix form on a semiconductor substrate, each of the pixels including a photoelectric converter that converts received light into a signal charge, and a plurality of first transfer electrodes that accumulate and transfer the signal charge read out from the photoelectric converter. The plurality of control lines are connected to mutually-corresponding ones of the first transfer electrodes in a plurality of pixels arranged in a specific row in the arrangement of the plurality of pixels. The plurality of pixels include a plurality of first pixels that receive visible light and a plurality of second pixels that receive infrared light. Each of floating diffusion layer-including pixels, the floating diffusion layer-including pixels being one or more of the plurality of pixels, further includes a floating diffusion layer that accumulates the transferred signal charge, and a readout circuit that reads out the signal charge accumulated in the floating diffusion layer. Each of floating diffusion layer-lacking pixels, the floating diffusion layer-lacking pixels being pixels aside from the floating diffusion layer-including pixels, shares the floating diffusion layer with one of the floating diffusion layer-including pixels arranged in a column direction of the arrangement of the plurality of pixels. One or more of the plurality of control lines are further connected to the first transfer electrodes of pixels that are arranged adjacent in the column direction to respective ones of the plurality of pixels arranged in the specific row and that share at least one of the floating diffusion layers.

An imaging device according to one aspect of the present disclosure includes the above-described solid-state imaging device, a light source that emits infrared light in pulses at a plurality of timings in each of exposure periods within a single frame period, and a processor that generates a range image based on a signal read out by the readout circuit.

According to the solid-state imaging device and imaging device configured as described above, the ratio of an opening in a pixel to the area of the pixel can be increased more than in the past.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENTS

Circumstances Leading to Realization of One Embodiment of the Present Disclosure Recently, smartphones, game consoles, and the like are being provided with rangefinding cameras, which detect movement in a subject's (a person's) body, hand, or the like by irradiating a space to be captured with infrared light, for example. The Time of Flight (TOF) technique is known as one principle of operations under which a subject distance is detected using a rangefinding camera.

Figure 33:
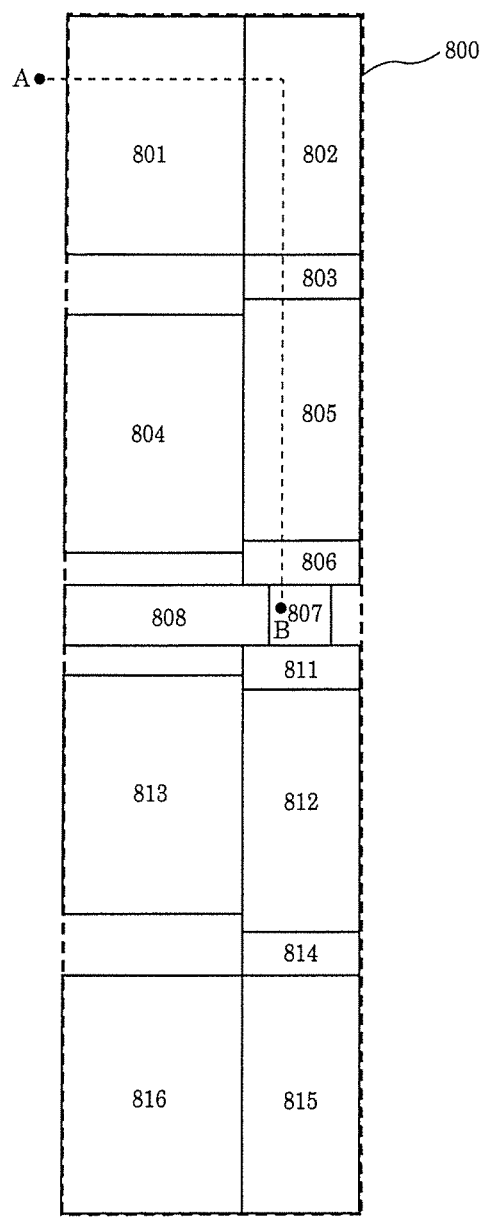
FIG. 33 is a plan view of a pixel in a solid-state imaging device according to related art.

FIG. 33 is a plan view of a pixel in a solid-state imaging device according to the related art disclosed in Japanese Unexamined Patent Application Publication No. 2013-175783.

In FIG. 33, 801, 804, 813, and 816 indicate photoelectric converters, 802, 805, 812, and 815 indicate charge holders, 803, 806, 811, and 814 indicate charge transferrers, 807 indicates a floating diffusion, and 808 collectively indicates other elements such as readout circuits and the like.

Figure 34:
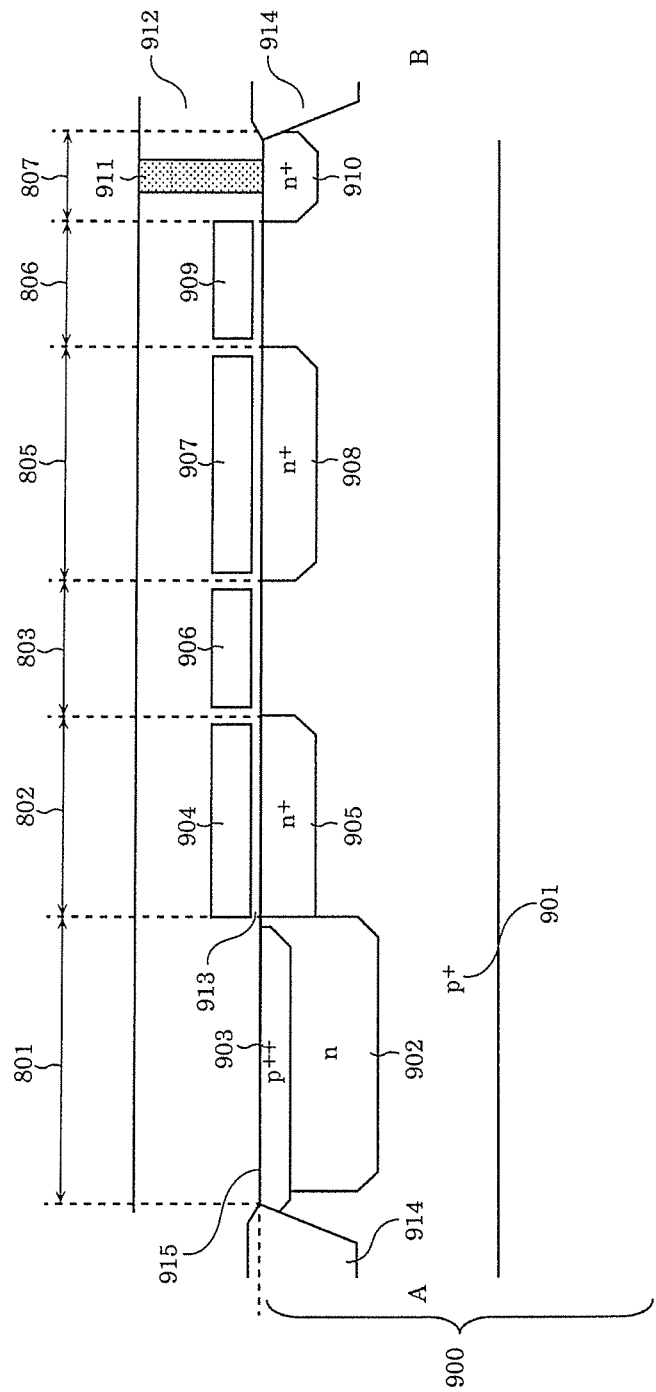
FIG. 34 is a cross-sectional view of a pixel in the solid-state imaging device according to related art.

FIG. 34 is a cross-sectional view of the pixel in the solid-state imaging device according to the related art. In FIG. 34, 904 and 907 indicate gate electrodes of the charge holders, 906 and 909 indicate gate electrodes of the charge transferrers, and 910 indicates the floating diffusion.

Figure 35:
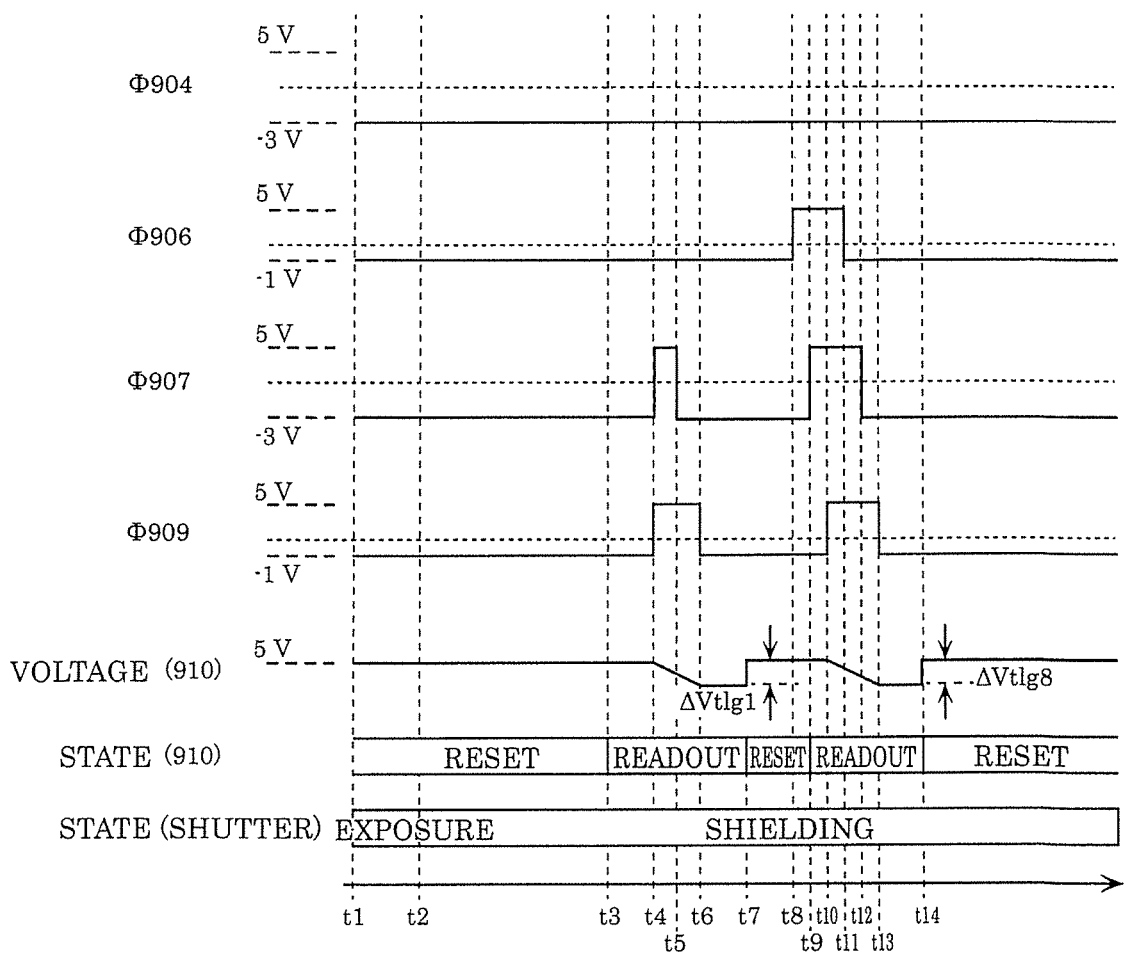
FIG. 35 is a timing chart of various types of signals in the solid-state imaging device according to related art.

FIG. 35 is a timing chart of various types of signals in the solid-state imaging device according to the related art. FIG. 35 illustrates a period for transferring a signal charge generated by photoelectric converters 801 and 804 to floating diffusion 807 by applying drive signals Φ904, Φ906, 0907, and Φ909 to the respective gate electrodes.

With a rangefinding camera that uses the TOF technique, for example, two types of signal charges are generated by emitting infrared light in pulses and receiving light reflected by a subject during two types of exposure periods. The distance to the subject is then found from the ratio of the signal charges.

Japanese Unexamined Patent Application Publication No. 2013-175783 discloses related art in which signal charges from a plurality of pixels are read out from a single floating diffusion and a readout circuit using charge transfers.

However, different drive signals are applied to the respective gate electrodes provided in a pixel that shares a floating diffusion, which means there are more control lines for transmitting the drive signals to the gate electrodes. There is thus an issue in that the openings that take in light cannot be widened sufficiently and the sensitivity characteristics drop as a result.

Additionally, because a solid-state imaging device used in a rangefinding camera exposes all of the pixels simultaneously, it is necessary to use a solid-state imaging device capable of global shutter scanning.

In this case too, the shutter is activated for all pixels simultaneously, which means that a charge accumulator is required for all of the pixels. This results in many control lines for controlling the readout circuit, charge accumulators, and the like being provided in the pixels. This reduces the size of the openings that take in light, and the sensitivity characteristics drop as a result.

Having extensively investigated the issues described above, the inventors of the present disclosure arrived at a solid-state imaging device that achieves high sensitivity characteristics while reducing the number of control lines for gate electrodes.

Embodiments of the present disclosure will be described hereinafter with reference to the drawings. Although the descriptions will be given with reference to the appended drawings, the descriptions and drawings are merely examples, and are not intended to limit the present disclosure. Elements indicating configurations, operations, and effects which are substantially identical throughout the drawings will be given identical reference signs.

Basic embodiments of the present disclosure will be described first.

Basic Embodiment 1 of the Present Disclosure

Figure 1:
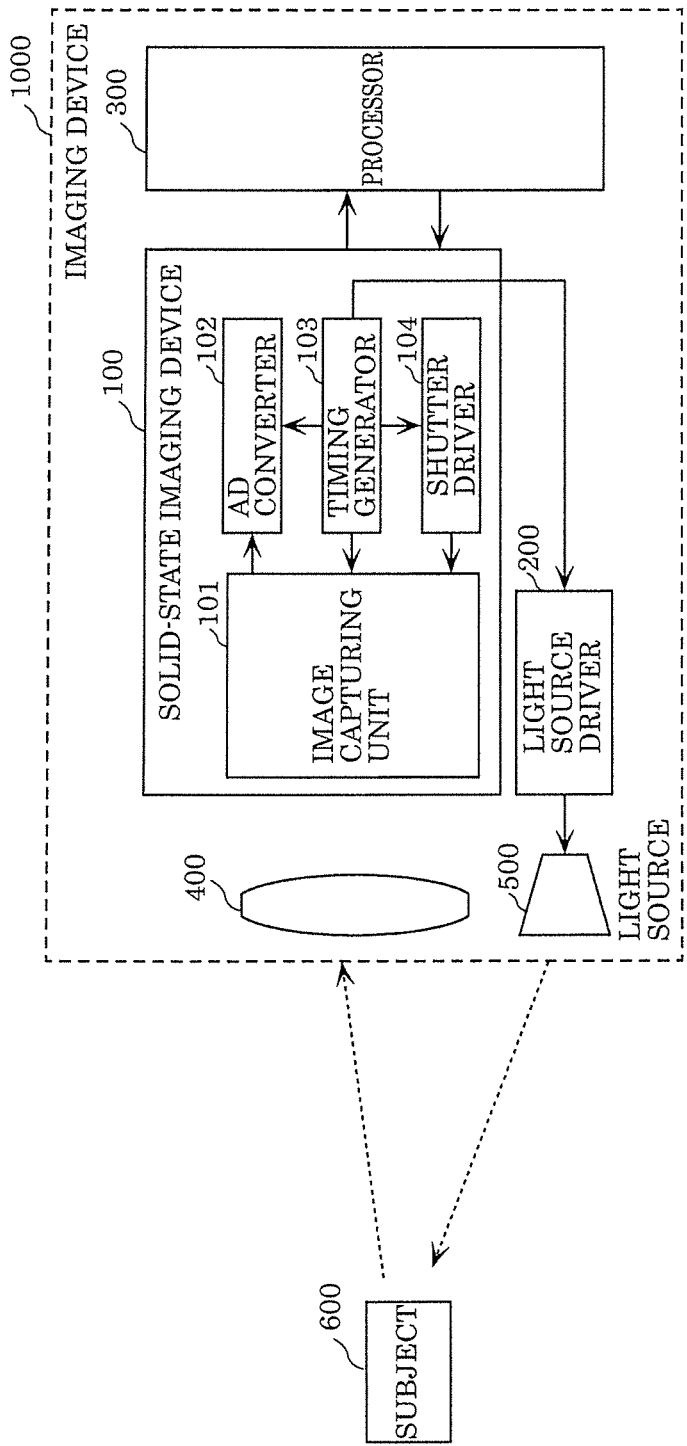
FIG. 1 is a function block diagram illustrating an example of the overall configuration of a rangefinding imaging device according to Basic Embodiment 1.

FIG. 1 is a function block diagram illustrating an example of the overall configuration of imaging device 1000 according to Basic Embodiment 1 of the present disclosure.

As illustrated in FIG. 1, imaging device 1000 includes solid-state imaging device 100, light source driver 200, processor 300, optical lens 400, and light source 500. Solid-state imaging device 100 includes image capturing unit 101, AD converter 102, timing generator 103, and shutter driver 104.

Timing generator 103 drives light source 500 through light source driver 200 by issuing a light emission signal instructing light source 500 to irradiate subject 600 with light (near-infrared light is given as an example here), and also issues an exposure signal instructing image capturing unit 101 to be exposed to light reflected by subject 600.

Image capturing unit 101 includes a plurality of pixels disposed in matrix form on a semiconductor substrate, and exposes a region containing subject 600 a plurality of times in a single frame period in accordance with a timing indicated by the exposure signal issued by timing generator 103 to obtain a signal corresponding to the total exposure amount from the plurality of exposures.

Processor 300 computes the distance to subject 600 based on the signal received from solid-state imaging device 100.

As illustrated in FIG. 1, subject 600 is irradiated with near-infrared light from light source 500, and is also irradiated with background light. Light reflected by subject 600 is incident on image capturing unit 101 through optical lens 400. The reflected light incident on image capturing unit 101 forms an image, and the image formed is then converted to an electrical signal. The operations of light source 500 and solid-state imaging device 100 are controlled by timing generator 103 of solid-state imaging device 100. The output from solid-state imaging device 100 is converted to a range image by processor 300, and depending on the application, is also converted to a visible image. Note that it is not absolutely necessary that processor 300 be provided outside solid-state imaging device 100, and some or all of the functions for calculating distance and so on may be built into solid-state imaging device 100.

What is known as a CMOS image sensor can be given as an example of solid-state imaging device 100.

Figure 2:
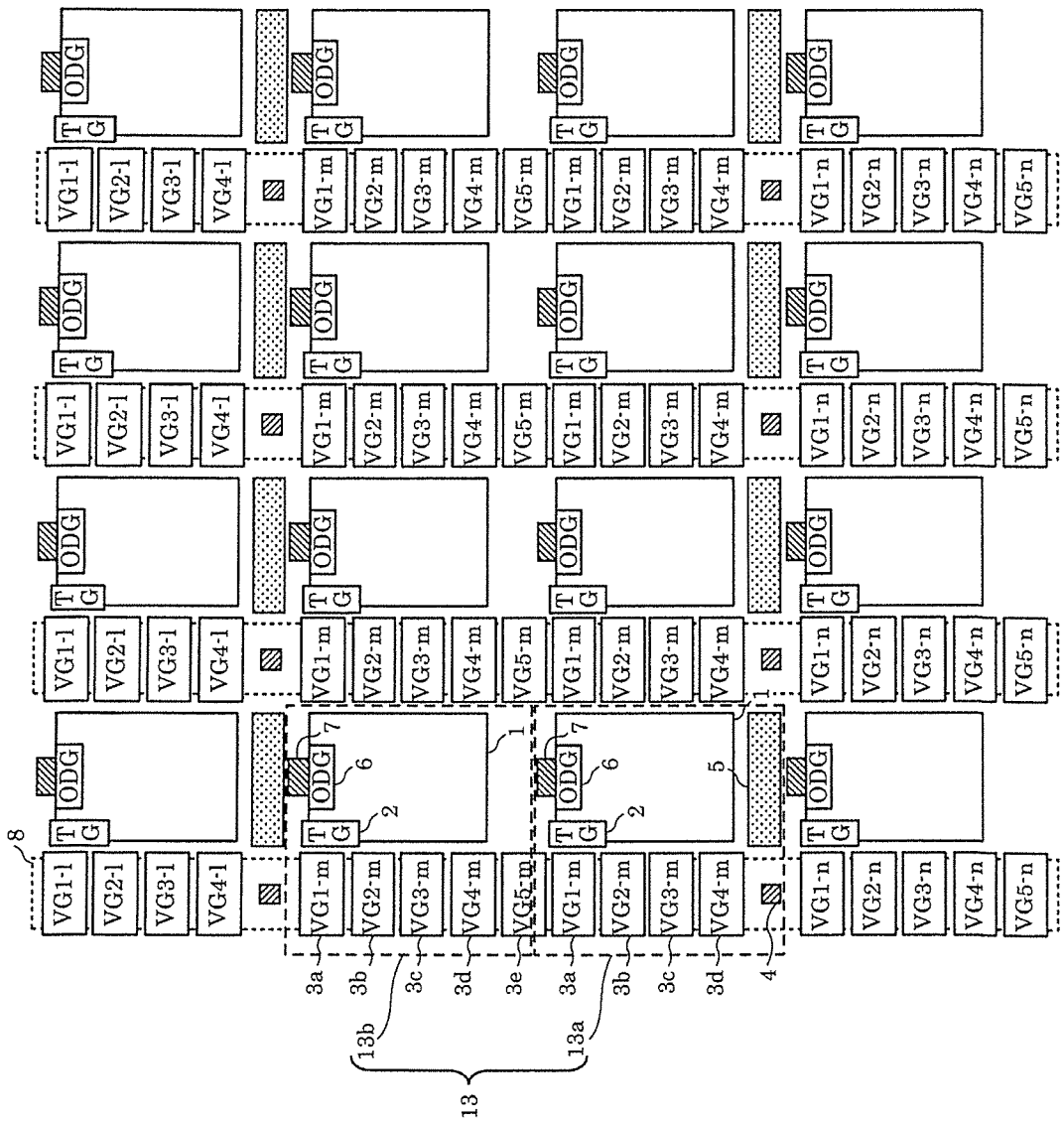
FIG. 2 is a schematic plan view illustrating a layout of pixels included in a solid-state imaging device according to Basic Embodiment 1.

FIG. 2 is a schematic plan view illustrating a layout of pixels 13 included in solid-state imaging device 100 according to Basic Embodiment 1. To simplify the drawing, FIG. 2 illustrates only four pixels in a vertical direction (a column direction of the plurality of pixels 13 disposed in matrix form, i.e., the up-down direction in FIG. 2) and four pixels in a horizontal direction (a row direction of the plurality of pixels 13 disposed in matrix form, i.e., the left-right direction in FIG. 2).

As illustrated in FIG. 2, solid-state imaging device 100 according to Basic Embodiment 1 includes pixels 13 (first pixels 13*a* and second pixels 13*b*) arranged in matrix form on a semiconductor substrate.

Each pixel 13 includes photoelectric converter 1, readout electrode 2, a plurality of first transfer electrodes (vertical transfer electrodes) 3, exposure control electrode 6, charge emitter 7, and transfer channel 8.

Each first pixel 13*a* includes four first transfer electrodes, i.e., first transfer electrodes 3*a*, 3*b*, 3*c*, and 3*d*, as the plurality of first transfer electrodes 3, and furthermore includes floating diffusion layer 4 and readout circuit 5.

On the other hand, each second pixel 13*b* includes five first transfer electrodes, i.e., first transfer electrodes 3*a*, 3*b*, 3*c*, 3*d*, and 3*e*, as the plurality of first transfer electrodes 3, but does not include floating diffusion layer 4 and readout circuit 5 included in first pixel 13*a*. Each second pixel 13*b* shares floating diffusion layer 4 with one of first pixels 13*a* arranged in the column direction of the plurality of pixels 13 arranged in matrix form.

Photoelectric converter 1 converts received light into a signal charge.

Readout electrode 2 reads out the signal charge from photoelectric converter 1.

First transfer electrodes 3 accumulate and transfer the signal charge read out from photoelectric converter 1.

Transfer channel 8 is a channel that accumulates the signal charges, running under each of the plurality of first transfer electrodes 3. A charge accumulator is formed by first transfer electrodes 3 to which a high voltage is applied and transfer channel 8 running under those electrodes. Here, the descriptions will be given assuming that each charge accumulator is driven in five phases as an example.

Floating diffusion layer 4 accumulates the transferred signal charges.

Readout circuit 5 reads out the signal charges accumulated in floating diffusion layer 4.

Due to the five-phase driving, the signal charges accumulated in each charge accumulator are transferred to floating diffusion layer 4 disposed below the charge accumulators in the vertical direction, and are read out to AD converter 102 by readout circuit 5.

Charge emitter 7 emits at least part of the signal charge from photoelectric converter 1.

Exposure control electrode 6 controls the stated emission to charge emitter 7.

As illustrated in FIG. 2, first pixel 13*a* is, with respect to the column direction, located at one end or another end of two or more pixels arranged in the column direction and sharing at least one floating diffusion layer 4 (here, for example, first pixel 13*a* and second pixel 13*b*).

In FIG. 2, first transfer electrodes 3 given the same reference sign (e.g., VG1-m, VG2-m, VG3-m, VG4-m, and so on) are connected to the same control line.

Figure 3:
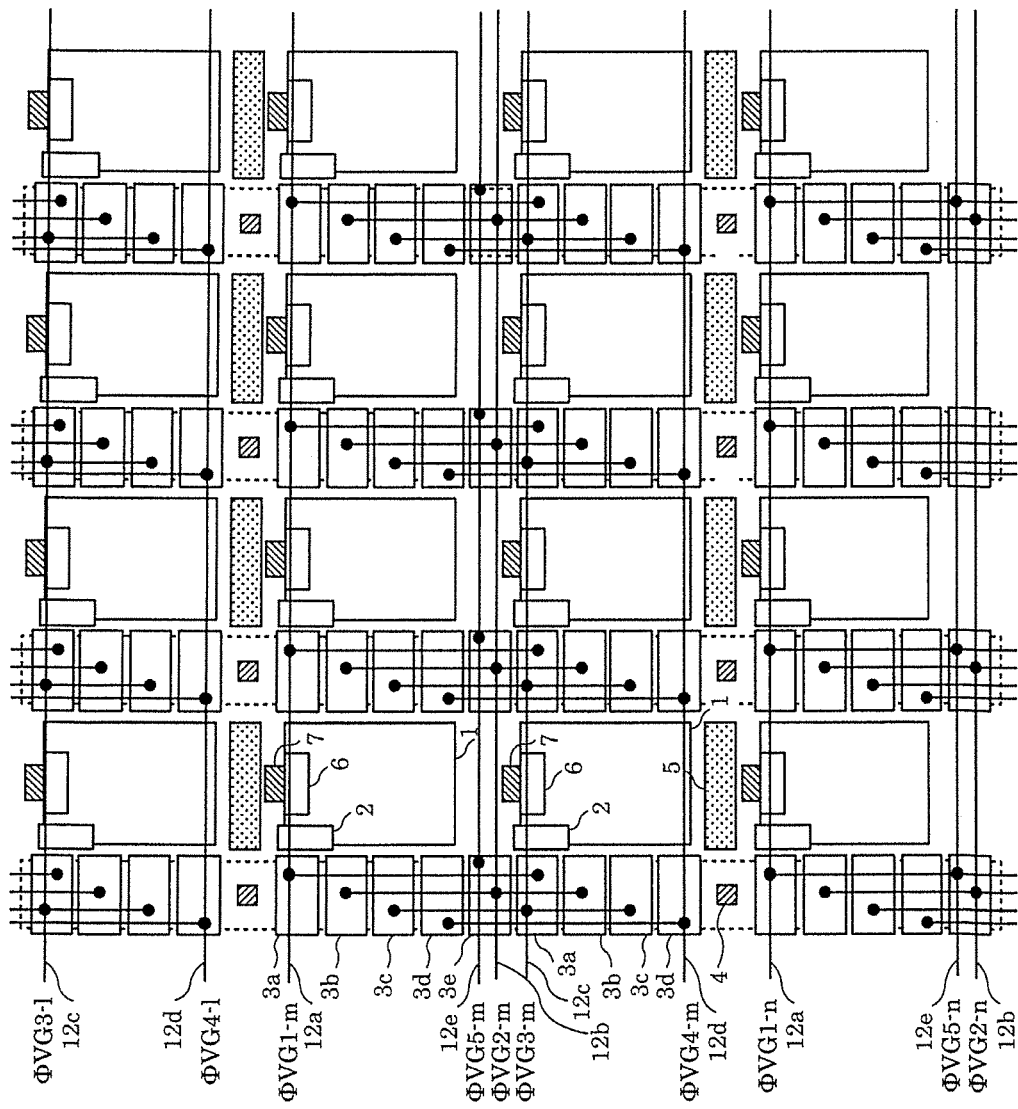
FIG. 3 is a schematic plan view illustrating a layout of control lines included in the solid-state imaging device according to Basic Embodiment 1.

FIG. 3 is a schematic plan view illustrating a layout of control lines 12 connected to first transfer electrodes 3, for pixels 13 included in solid-state imaging device 100 according to Basic Embodiment 1.

As illustrated in FIG. 3, solid-state imaging device 100 includes a plurality of control lines 12 (here, control lines 12a to 12e, for example), each connected to corresponding ones of first transfer electrodes 3 (here, first transfer electrodes 3 given the same reference sign (e.g., VG1-m or the like) in FIG. 2) in a specific row of the plurality of pixels 13 disposed in matrix form (here, the second row from the top, for example). At least some of these control lines 12 (here, control lines 12a to 12d, for example) are further connected to at least one of first transfer electrodes 3 (here, first transfer electrodes 3 to which the same reference sign is assigned) of pixels 13 arranged in the column direction and sharing floating diffusion layer 4, for the plurality of pixels 13 arranged in the specific row (here, pixels 13 in the third row from the top, for example).

As illustrated in FIG. 3, connecting the plurality of first transfer electrodes 3 provided in a plurality (e.g., two) pixels 13 arranged in the vertical direction reduces the number of control lines 12 provided in the horizontal direction.

Figure 4:
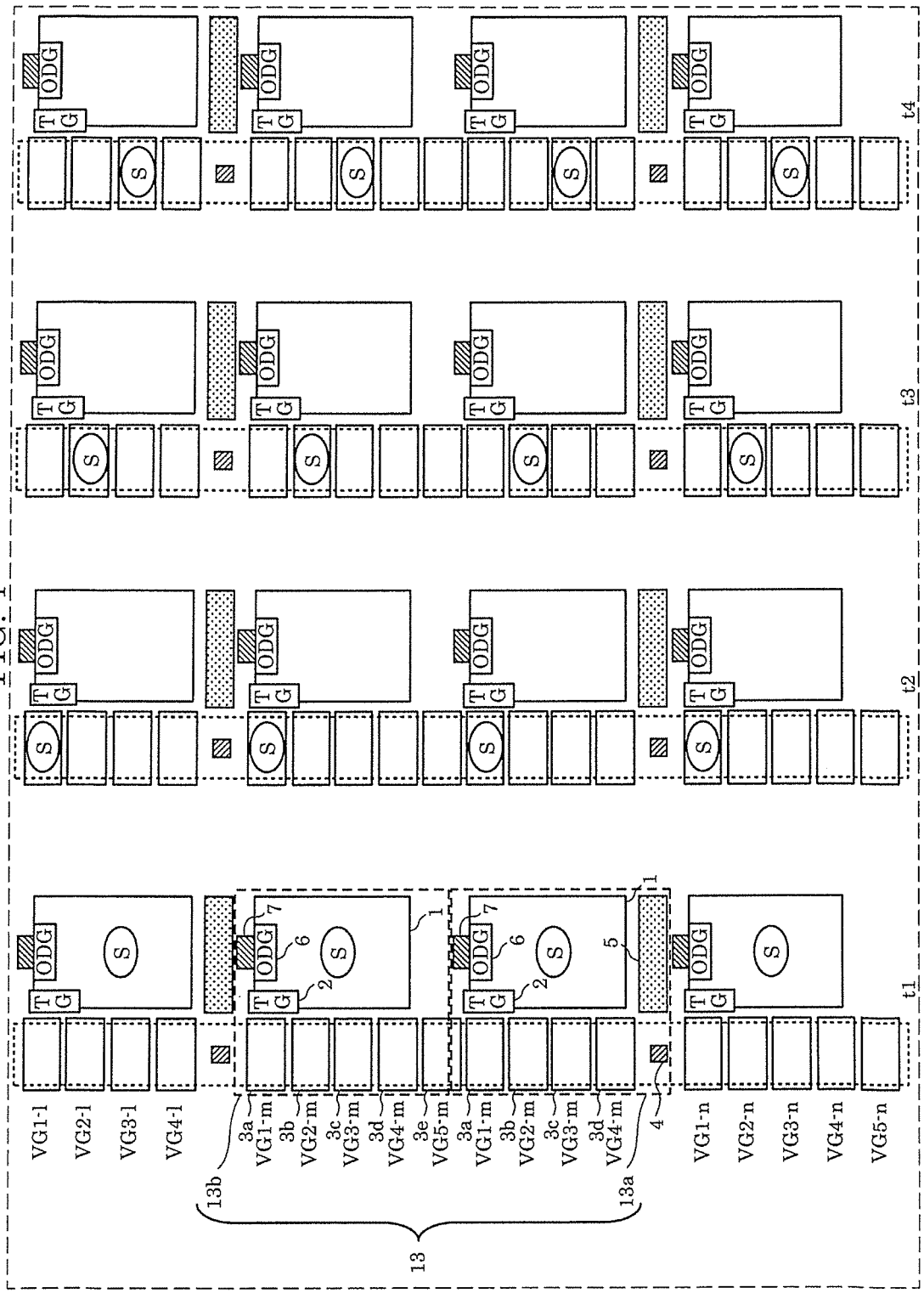
FIG. 4 is a schematic plan view illustrating operations in an exposure period of the solid-state imaging device according to Basic Embodiment 1.
Figure 5:
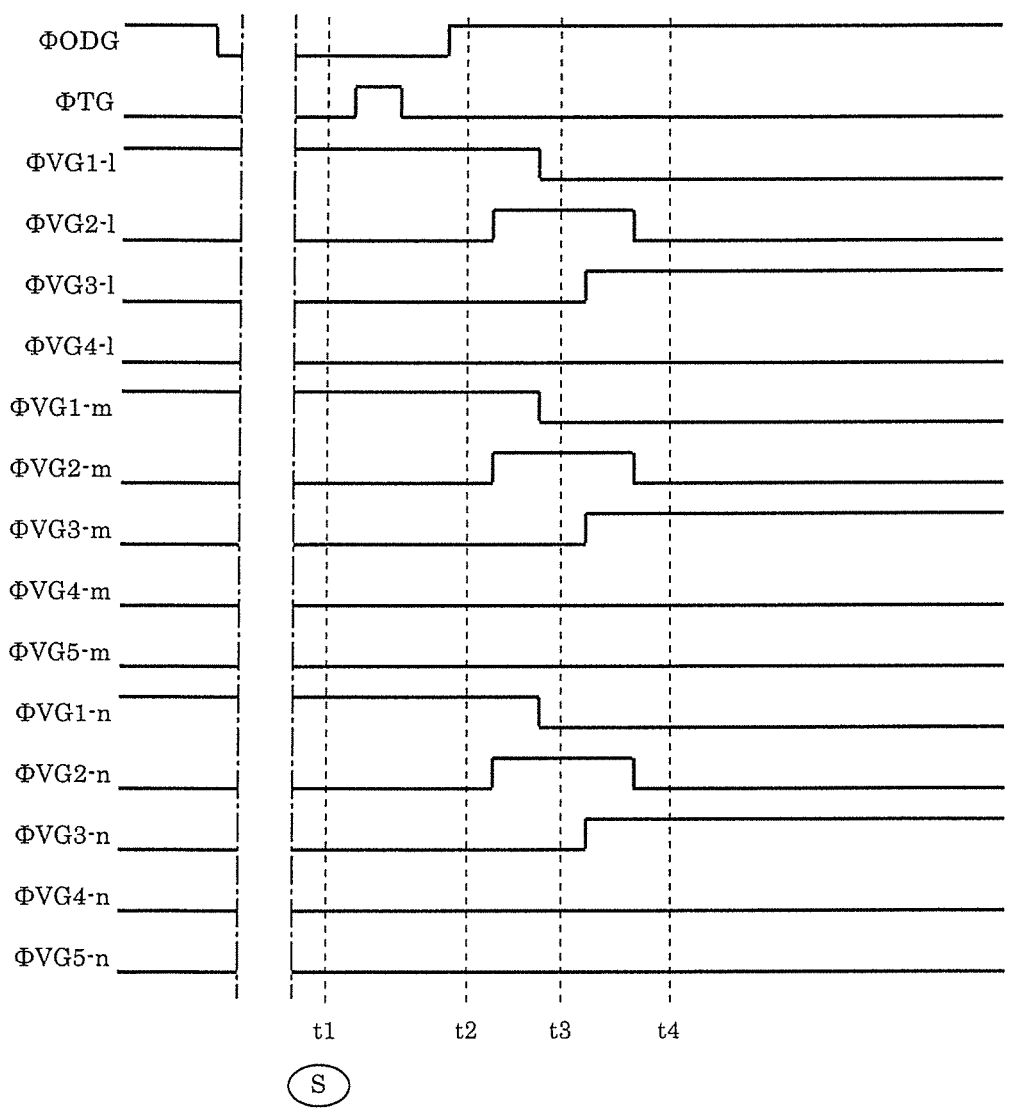
FIG. 5 is a driving timing chart illustrating operations in the exposure period of the solid-state imaging device according to Basic Embodiment 1.

FIG. 4 is a schematic plan view illustrating operations during an exposure period of solid-state imaging device 100 according to Basic Embodiment 1, and FIG. 5 is a driving timing chart illustrating operations during the exposure period of solid-state imaging device 100 according to Basic Embodiment 1.

Operations of solid-state imaging device 100 during the exposure period will be described next with reference to FIGS. 4 and 5.

Drive pulse ΦODG is applied to each of exposure control electrodes 6; drive pulse ΦTG, to each readout electrode 2; and drive pulses ΦVG1-1 to ΦVG5-n, to each of first transfer electrodes 3. As illustrated in FIG. 5, in the exposure period, drive pulse ΦVG14, drive pulse ΦVG1-m, and drive pulse ΦVG1-n are signals that change at the same phase, and are substantially identical signals.

These drive pulses are output from timing generator 103.

As an initial state, drive pulse ΦODG applied to exposure control electrode 6 is in a high state, and photoelectric converter 1 is in a reset state. Additionally, ΦTG applied to readout electrode 2 is in a low state, and first transfer electrodes 3a held at a high state (VG1-1, VG1-m, and VG1-n in FIG. 2) and photoelectric converter 1 are electrically disconnected. In this state, the signal charge generated by photoelectric converter 1 is emitted to charge emitter 7 via exposure control electrode 6, and is not accumulated in photoelectric converter 1.

Next, at time t1, exposure control electrode 6 goes to a low state, the emission of the charge from photoelectric converter 1 to charge emitter 7 is stopped, and photoelectric converter 1 enters a state of accumulating the generated signal charge.

Then, at time t2, when readout electrode 2 goes to a high state for a set period and then returns to a low state, the readout of signal charge S from photoelectric converter 1 to first transfer electrodes 3a (VG1-1, VG1-m, and VG1-n in FIG. 2), simultaneously for all pixels 13 in image capturing unit 101, ends, and exposure control electrode 6 returns to the high state.

Next, by applying the five-phase drive pulse to first transfer electrodes 3, all pixels 13 in image capturing unit 101 simultaneously transfer signal charge S under first transfer electrodes 3b (VG2-1, VG2-m, and VG2-n in FIG. 2) (t3). Furthermore, by applying the five-phase drive pulse to first transfer electrodes 3, all pixels 13 in image capturing unit 101 simultaneously transfer signal charge S under first transfer electrodes 3c (VG3-1, VG3-m, and VG3-n in FIG. 2) (t4).

In this manner, in the exposure period within a single frame period, potentials of each of the corresponding first transfer electrodes 3 change in the same manner for all of the plurality of pixels 13.

Figure 6:
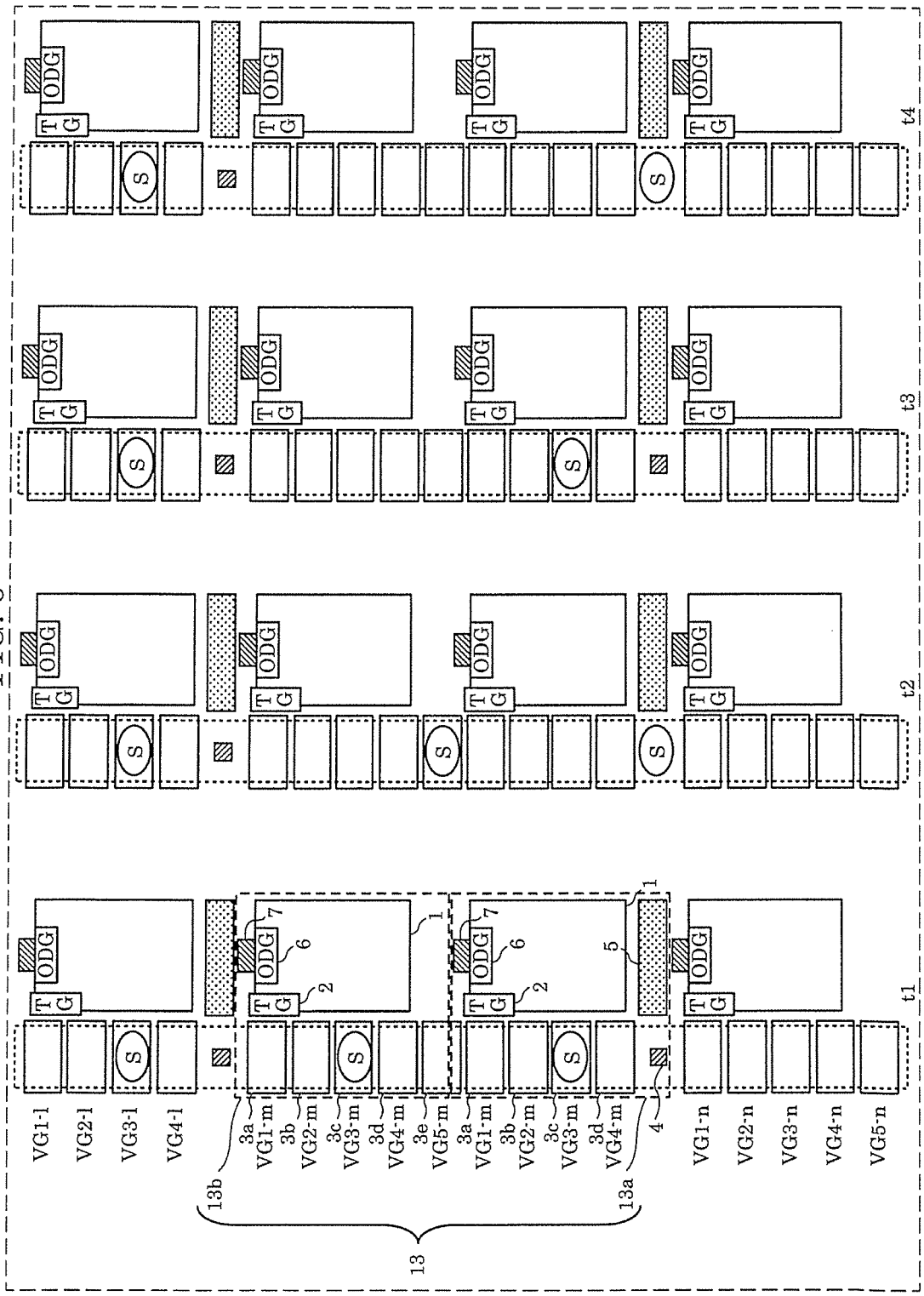
FIG. 6 is a schematic plan view illustrating operations in a transfer period of the solid-state imaging device according to Basic Embodiment 1.
Figure 7:
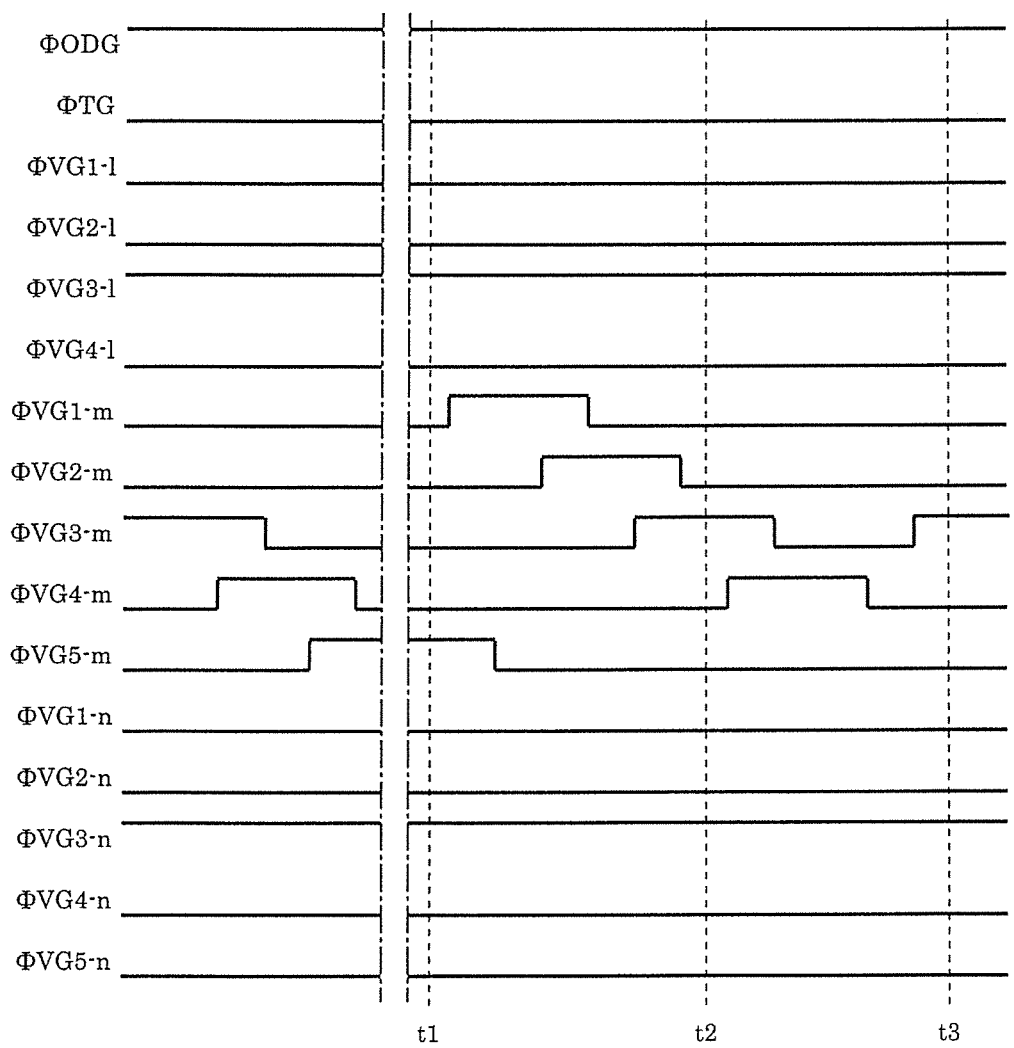
FIG. 7 is a driving timing chart illustrating operations in the transfer period of the solid-state imaging device according to Basic Embodiment 1.

FIG. 6 is a schematic plan view illustrating operations during a transfer period of solid-state imaging device 100 according to Basic Embodiment 1, and FIG. 7 is a driving timing chart illustrating operations during the transfer period of solid-state imaging device 100 according to Basic Embodiment 1.

Operations of solid-state imaging device 100 during the transfer period will be described next with reference to FIGS. 6 and 7.

Focusing on row m (the second row from the top and the third row from the top in FIG. 6), at initial time t1, first transfer electrodes 3c (VG3-m in FIG. 2) are in the high state, and signal charge S is accumulated under the electrodes.

Next, by applying the five-phase drive pulse to first transfer electrodes 3c to 3e in row m (VG3-m, VG4-m, and VG5-m in FIG. 2), signal charge S in row m is transferred to first transfer electrodes 3e (VG5-m in FIG. 2) and floating diffusion layer 4 (t2). Although not illustrated here, signal charge S transferred to floating diffusion layer 4 is read out via readout circuit 5.

Next, by applying the five-phase drive pulse to first transfer electrodes 3e and 3a to 3c in row m (VG5-m, VG1-m, VG2-m, and VG3-m in FIG. 2), signal charge S in row m is transferred to first transfer electrodes 3c (VG3-m in FIG. 2) (t3). Furthermore, by applying the five-phase drive pulse to first transfer electrodes 3c and 3d in row m (VG3-m and VG4-m in FIG. 2), signal charge S in row m is transferred to floating diffusion layer 4 and is read out via readout circuit 5 (t4).

Here, unlike the exposure period, in the transfer period, during the period in which pixels 13 in row m operate (the second row from the top and the third row from the top in FIG. 6), only pixels 13 in row m operate, and the operations of the other pixels 13 are stopped. In other words, first pixels 13a are arranged in rows in which a plurality of floating diffusion layers are disposed (here, the first row from the top and the third row from the top in FIG. 2). In the transfer period within a single frame period, potentials of the plurality of first transfer electrodes 3 which correspond to each other in pixel group units, the units constituted by first pixels 13a disposed in a row in which a plurality of floating diffusion layers are disposed (here, the third row from the top in FIG. 2) and pixels 13 sharing floating diffusion layer 4 included in those first pixels 13a, change in the same manner. During a period in which the potentials of first transfer electrodes 3 are changing in one pixel group, the potentials of first transfer electrodes 3 in other pixel groups do not change.

According to solid-state imaging device 100 of Basic Embodiment 1 as described thus far, causing first transfer electrodes 3 of a plurality of pixels 13 to operate at the same timings makes it possible to connect those pixels 13 with the same control lines 12, and the number of control lines 12 used for a single pixel 13 can therefore be reduced. The area of the openings that take in light can therefore be increased, which makes it possible to provide a solid-state imaging device having excellent sensitivity characteristics.

In Basic Embodiment 1, signal charges read out from a plurality of (e.g., two) photoelectric converters 1 are read out from a single floating diffusion layer 4 and readout circuit 5. However, it is possible to provide a solid-state imaging device that reduces the number of control lines used for a single pixel 13 even more, and that therefore has even better sensitivity characteristics, by reading out signal charges read out from more, e.g., four photoelectric converters 1 via a single floating diffusion layer 4 and readout circuit 5.

Basic Embodiment 2 of the Present Disclosure

A solid-state imaging device according to Basic Embodiment 2 of the present disclosure will be described next, focusing on the differences from Basic Embodiment 1.

Figure 8:
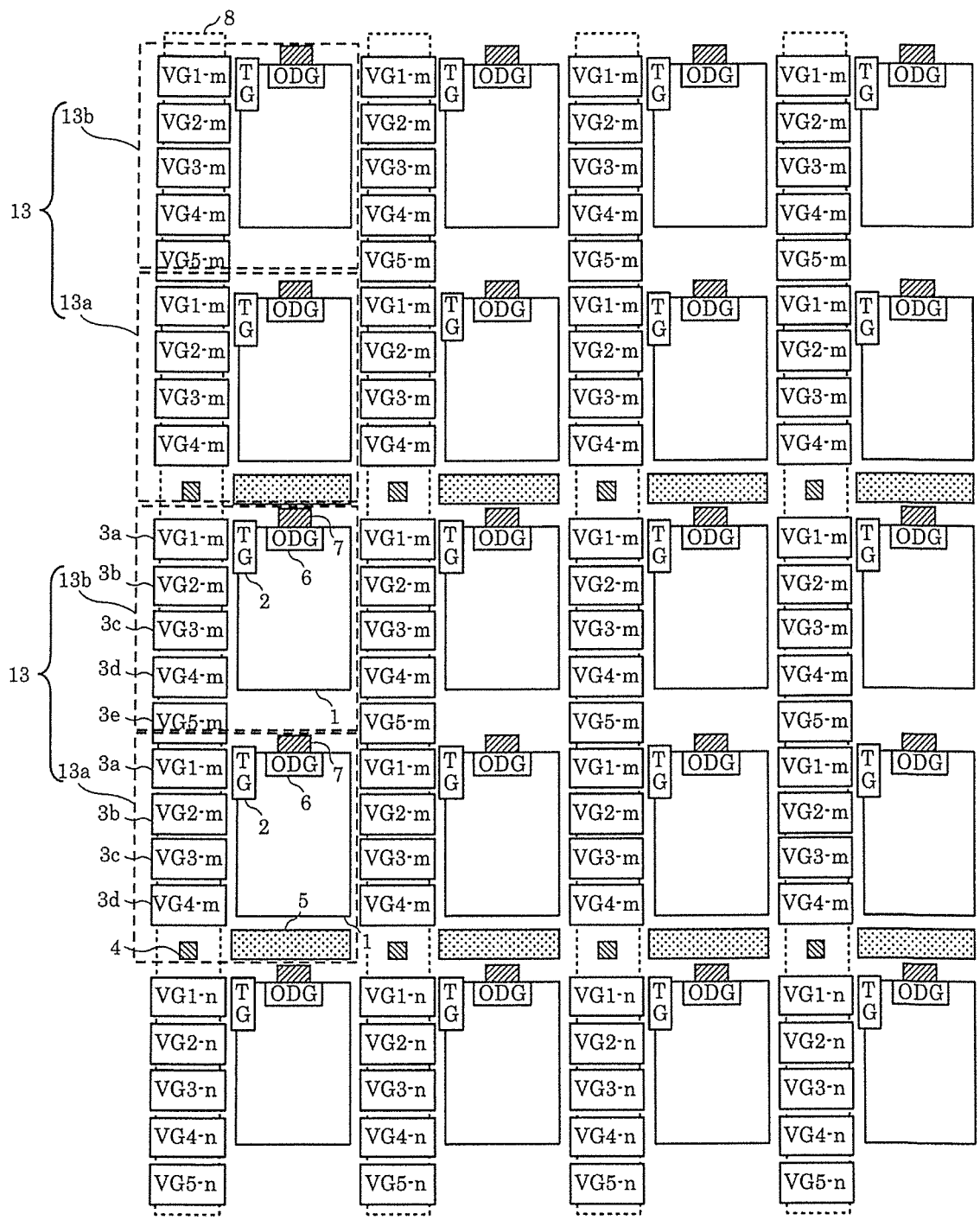
FIG. 8 is a schematic plan view illustrating a layout of pixels included in a solid-state imaging device according to Basic Embodiment 2.

FIG. 8 is a schematic plan view illustrating a layout of pixels 13 included in the solid-state imaging device according to Basic Embodiment 2.

In the solid-state imaging device according to Basic Embodiment 2, the configuration of control lines 12 (not shown in FIG. 8) connected to first transfer electrodes 3 is different from that in Basic Embodiment 1. Specifically, VG1-1 to VG5-1, which are first transfer electrodes 3, are replaced with VG1-$m$ to VG5-$m$, which are first transfer electrodes 3, and the readout operations in the transfer period are different as a result. Here, first transfer electrodes 3 given the same reference sign (e.g., VG1-$m$, VG2-$m$, VG3-$m$, VG4-$m$, and so on) are connected to the same control line 12.

As a result, the number of control lines can be reduced by more than in Basic Embodiment 1; furthermore, because readout circuits 5 in two rows operate simultaneously, the transfer period within a single frame can be shortened. Note that in this case, for example, AD converter 102 requires two sets of circuits that execute readout operations using readout circuit 5 of one row and that operate independent of each other, so that the signal charges can be read out using readout circuits 5 from two rows simultaneously.

Figure 9:
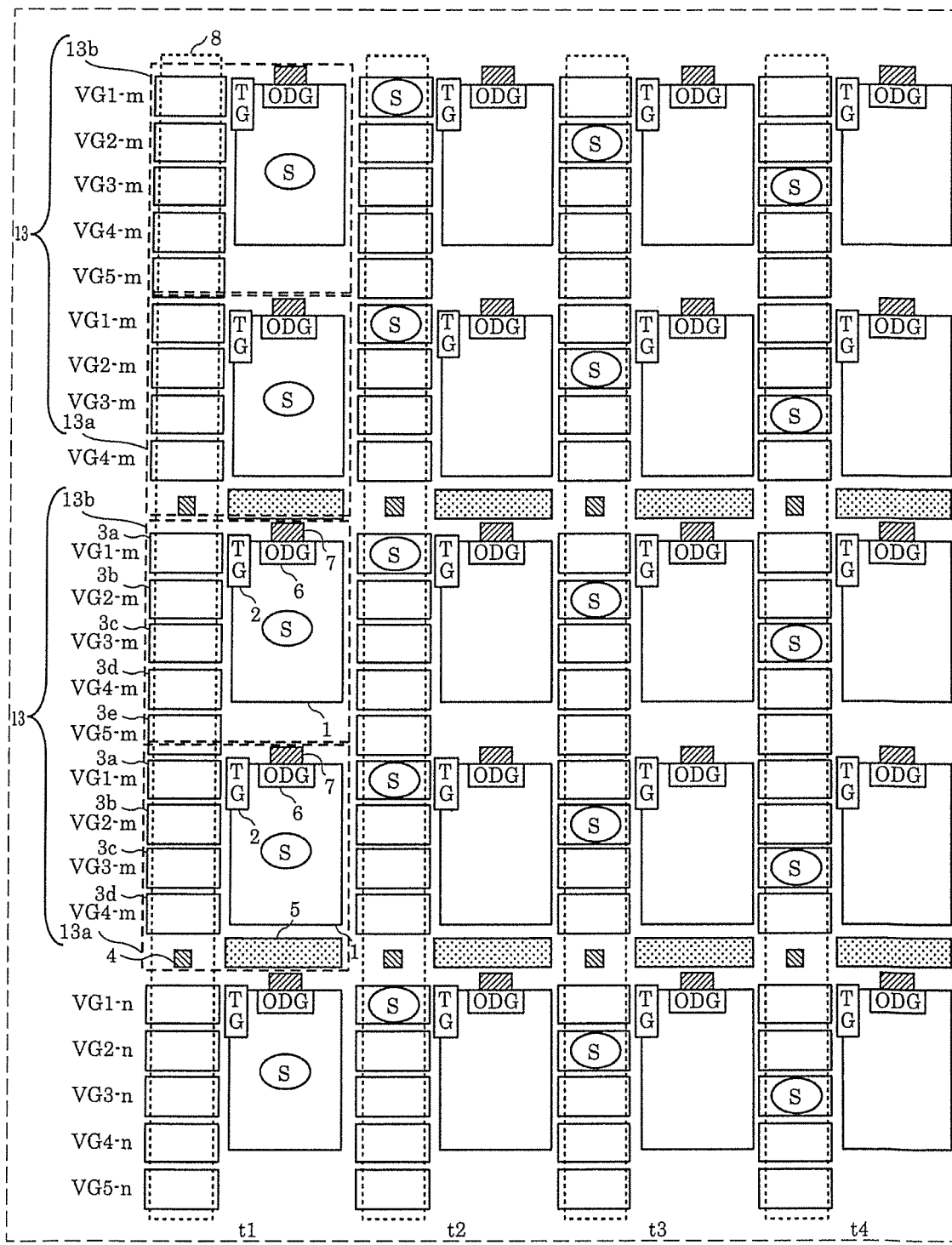
FIG. 9 is a schematic plan view illustrating operations in an exposure period of the solid-state imaging device according to Basic Embodiment 2.

FIG. 9 is a schematic plan view illustrating operations during an exposure period of the solid-state imaging device according to Basic Embodiment 2, and a driving timing chart illustrating the operations in the exposure period is the same as that illustrated in FIG. 5.

The exposure period operations of the solid-state imaging device according to Basic Embodiment 2 illustrated in FIG. 9 differ from Basic Embodiment 1 only in that VG1-1 to VG5-1, which are first transfer electrodes 3, have been replaced with VG1-$m$ to VG5-$m$, which are first transfer electrodes 3, and the operations themselves are the same.

Figure 10:
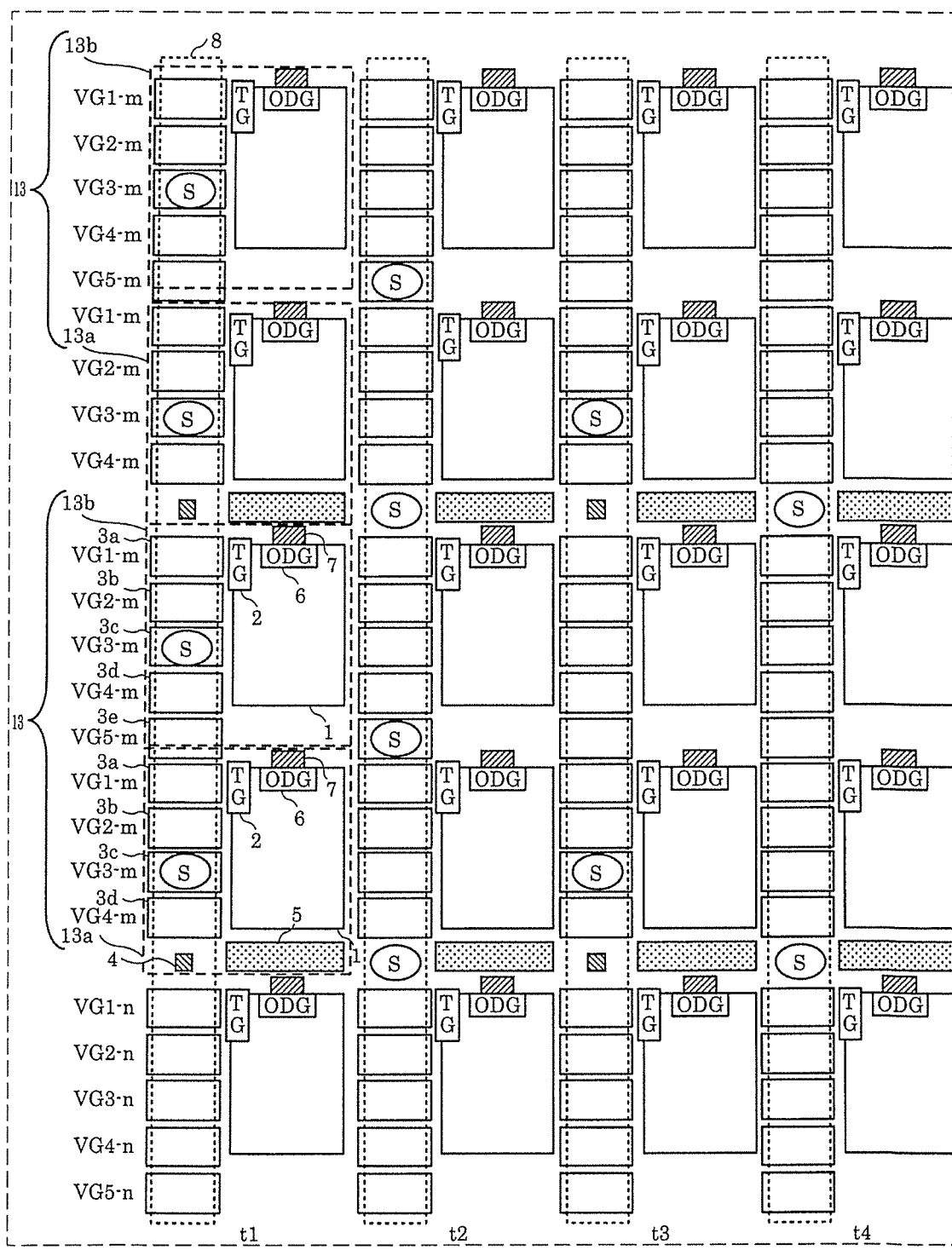
FIG. 10 is a schematic plan view illustrating operations in a transfer period of the solid-state imaging device according to Basic Embodiment 2.

FIG. 10 is a schematic plan view illustrating operations during a transfer period of the solid-state imaging device according to Basic Embodiment 2, and a driving timing chart illustrating the operations in the transfer period is the same as that illustrated in FIG. 7.

Operations of the solid-state imaging device according to Basic Embodiment 2 during the transfer period will be described next with reference to FIGS. 10 and 7.

At times t1 and t3, solid-state imaging device 100 according to Basic Embodiment 1 reads out signal charge S via floating diffusion layer 4 and readout circuit 5 disposed in one row. However, the solid-state imaging device according to Basic Embodiment 2 reads out signal charge S via floating diffusion layers 4 and readout circuits 5 disposed in two rows simultaneously.

According to the solid-state imaging device of Basic Embodiment 2 as described thus far, the number of first transfer electrodes 3 and readout circuits 5 operating simultaneously in the transfer period can be increased. As a result, compared to solid-state imaging device 100 according to Basic Embodiment 1, the solid-state imaging device according to Basic Embodiment 2 can reduce the number of control lines per pixel 13, and can also shorten the transfer period within a single frame. This makes it possible to improve the sensitivity characteristics and increase the framerate.

Basic Embodiment 3 of the Present Disclosure

A solid-state imaging device according to Basic Embodiment 3 of the present disclosure will be described next, focusing on the differences from Basic Embodiment 1.

Figure 11:
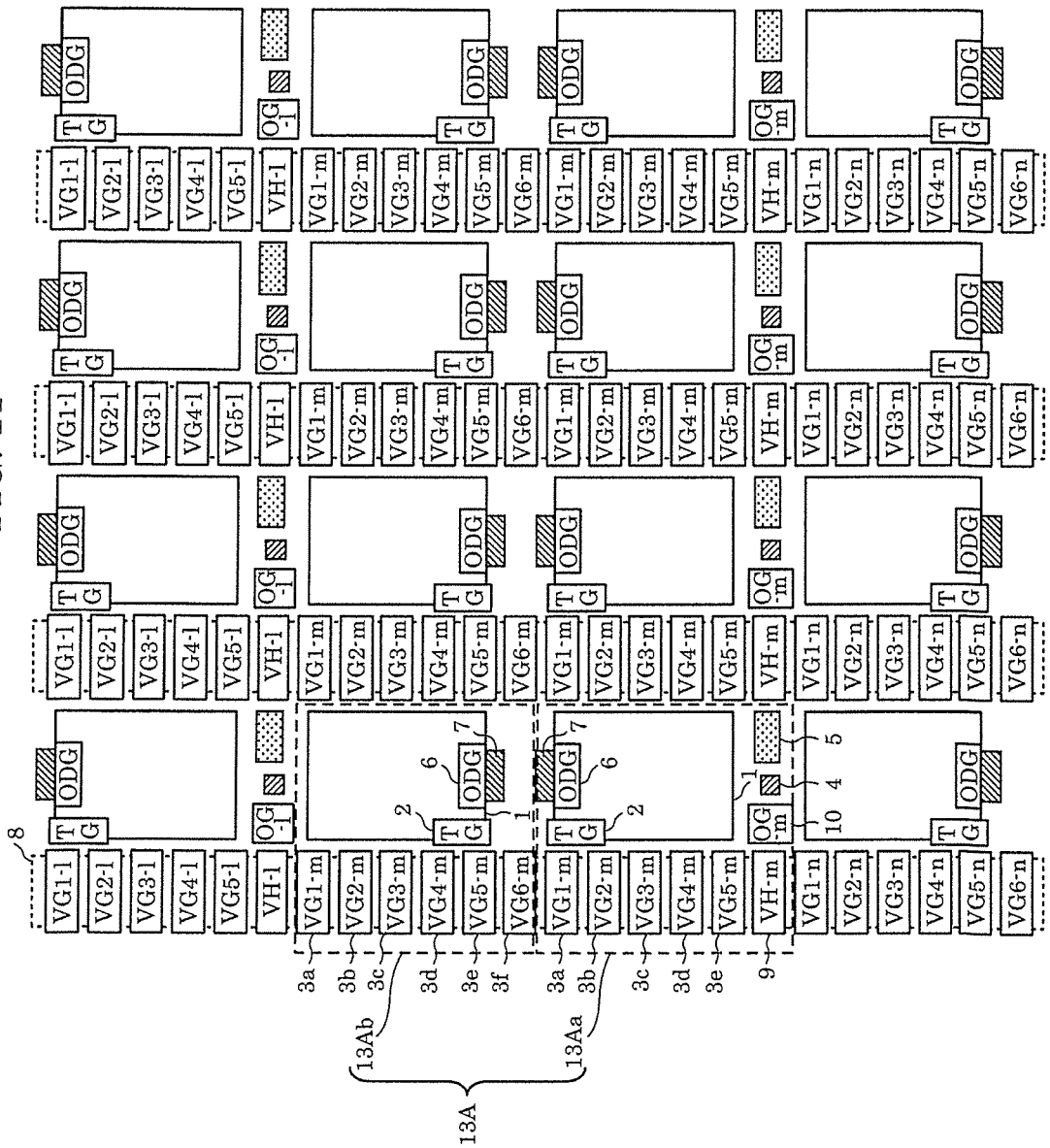
FIG. 11 is a schematic plan view illustrating a layout of pixels included in a solid-state imaging device according to Basic Embodiment 3.

FIG. 11 is a schematic plan view illustrating a layout of pixels 13A included in the solid-state imaging device according to Basic Embodiment 3. Compared to Basic Embodiment 1, in the solid-state imaging device according to Basic Embodiment 3, first pixels 13$a$ according to Basic Embodiment 1 are changed to first pixels 13Aa, and second pixels 13$b$ according to Basic Embodiment 1 are changed to second pixels 13Ab.

First pixel 13Aa is configured by adding first transfer electrode 3$e$, second transfer electrode 9, and output control electrode 10 to first pixel 13$a$ according to Basic Embodiment 1.

Second transfer electrode 9 is disposed adjacent to one of first transfer electrodes 3 (first transfer electrode 3$e$, here) in the column direction of the plurality of pixels 13A disposed in matrix form, i.e., in the up-down direction in FIG. 11, and transfers signal charges in the column direction and the row direction.

Output control electrode 10 is disposed adjacent to second transfer electrode 9 in the row direction of the plurality of pixels 13A disposed in matrix form, i.e., in the left-right direction in FIG. 11, and transfers signal charges in the row direction.

Additionally, in first pixel 13Aa, floating diffusion layer 4 is disposed adjacent to output control electrode 10 in the row direction.

Second pixel 13Ab is configured by adding first transfer electrode 3$f$ to second pixel 13$b$ according to Basic Embodiment 1.

Like second pixel 13$b$ according to Basic Embodiment 1, second pixel 13Ab shares floating diffusion layer 4 with one of first pixels 13Aa arranged in the column direction.

Additionally, with second pixel 13Ab, the positions of readout electrode 2, exposure control electrode 6, and charge emitter 7 relative to photoelectric converter 1 have been changed to be symmetrical with respect to the column direction, as opposed to second pixel 13$b$ in Basic Embodiment 1.

As a result, first pixels 13Aa, each including readout electrode 2 above photoelectric converter 1 in the vertical direction, and second pixels 13Ab, each including readout electrode 2 below photoelectric converter 1 in the vertical direction, are disposed alternately from row to row. The signal charges read out from the two photoelectric converters 1 adjacent in the vertical direction are thus added below first transfer electrodes 3, and the sensitivity characteristics of the solid-state imaging device can be improved as a result.

In other words, in two or more pixels 13A sharing at least one floating diffusion layer 4 arranged in the column direction (here, first pixel 13Aa and second pixel 13Ab), the signal charges read out from photoelectric converters 1 are added under at least one of the plurality of first transfer electrodes 3 included in the two or more pixels 13A (here, first transfer electrode 3e of second pixel 13Ab, first transfer electrode 3f of second pixel 13Ab, and first transfer electrode 3a of first pixel 13Aa). The specific operations will be described later with reference to FIG. 13.

Additionally, a charge accumulator is formed by first transfer electrodes 3 and second transfer electrode 9 to which a high voltage is applied and transfer channel 8 provided under those electrodes. Here, the descriptions will be given assuming that each charge accumulator is driven in six phases as an example. As such, four types of signal charges can be accumulated in units of two pixels, and thus the solid-state imaging device according to Basic Embodiment 3 can be used in a rangefinding camera.

In FIG. 11, first transfer electrodes 3 given the same reference sign (e.g., VG1-$m$, VG2-$m$, VG3-$m$, VG4-$m$, and so on) are connected to the same control line.

Figure 12:
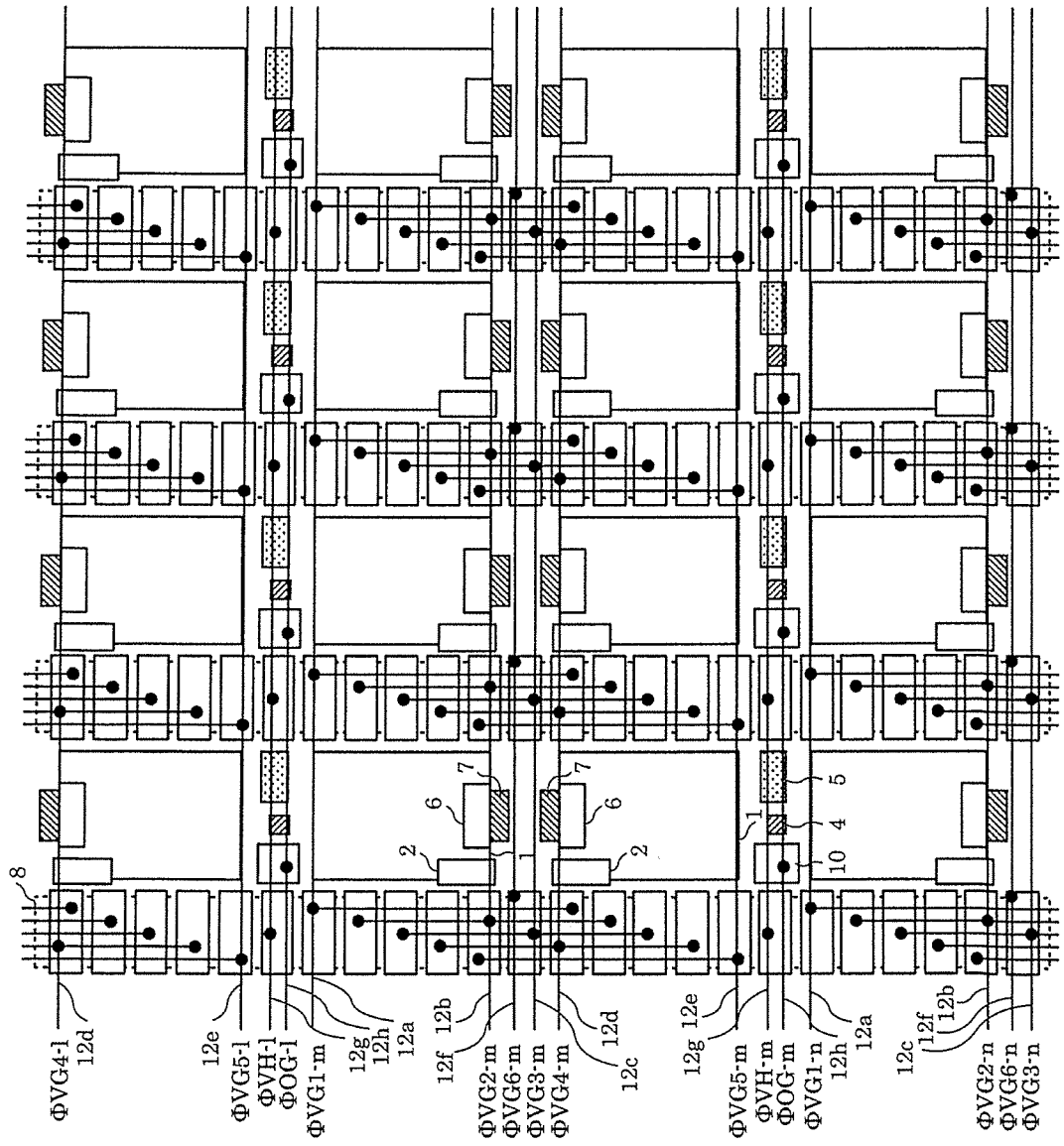
FIG. 12 is a schematic plan view illustrating a layout of control lines included in the solid-state imaging device according to Basic Embodiment 3.

FIG. 12 is a schematic plan view illustrating a layout of control lines 12 connected to first transfer electrodes 3, second transfer electrode 9, and output control electrode 10, for pixels 13A included in the solid-state imaging device according to Basic Embodiment 3.

As illustrated in FIG. 12, connecting the plurality of first transfer electrodes 3 provided in a plurality (e.g., two) pixels 13A arranged in the vertical direction reduces the number of control lines 12 provided in the horizontal direction.

Figure 13:
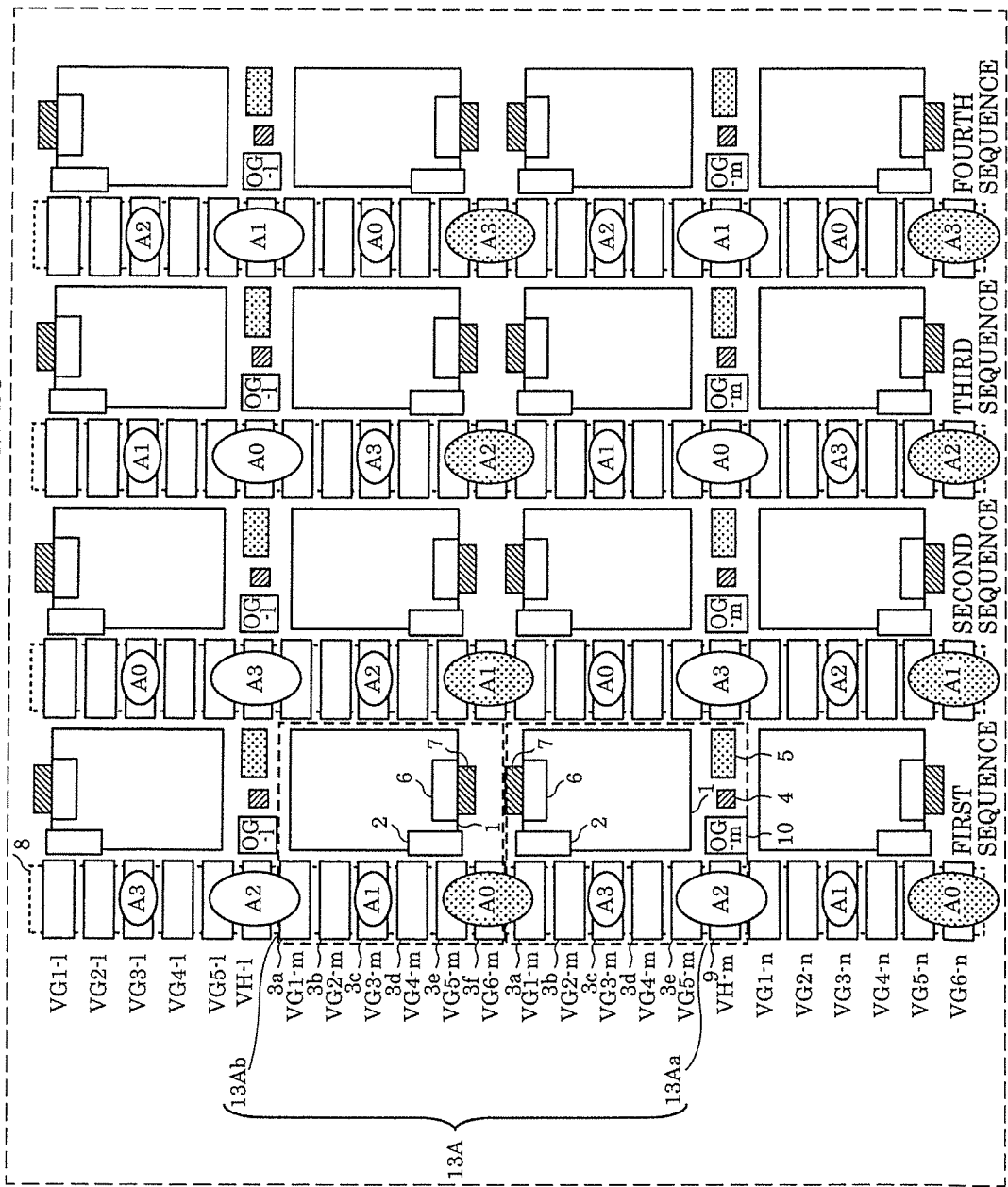
FIG. 13 is a schematic plan view illustrating operations in an exposure period of the solid-state imaging device according to Basic Embodiment 3.

FIG. 13 is a schematic plan view illustrating operations during an exposure period of the solid-state imaging device according to Basic Embodiment 3, and FIGS. 14A to 14D are driving timing charts illustrating operations during the exposure period of the solid-state imaging device according to Basic Embodiment 3.

Operations of the solid-state imaging device according to Basic Embodiment 3 during the exposure period will be described next with reference to FIGS. 13 and 14A to 14D.

Drive pulse ΦODG is applied to each of exposure control electrodes 6; and drive pulse ΦTG, to each readout electrode 2. Although not illustrated in FIGS. 13 and 14A to 14D, during exposure, a high voltage is applied for applied pulse ΦVG1 of first transfer electrode 3a, applied pulse ΦVG3 of first transfer electrode 3c, applied pulse ΦVG5 of first transfer electrode 3e, applied pulse ΦVG6 of first transfer electrode 3f, and applied pulse ΦVH of second transfer electrode 9, and a low voltage is applied for the applied pulse of the other first transfer electrodes 3. The signal charges can be accumulated under first transfer electrodes 3 to which the high voltage has been applied, and a charge accumulator is formed. Additionally, pulsed infrared light that repeatedly turns on and off at a constant cycle is repeatedly emitted from light source 500.

In an initial state, exposure control electrode 6 and readout electrode 2 are in the high state, and the signal charge generated by photoelectric converter 1 is emitted to charge emitter 7 via exposure control electrode 6.

In first to fourth sequences illustrated in FIGS. 14A to 14D, readout electrode 2 is always in the high state, but the timings of the drive pulse ΦODG synchronized with the emitted light are different.

Figure 14:
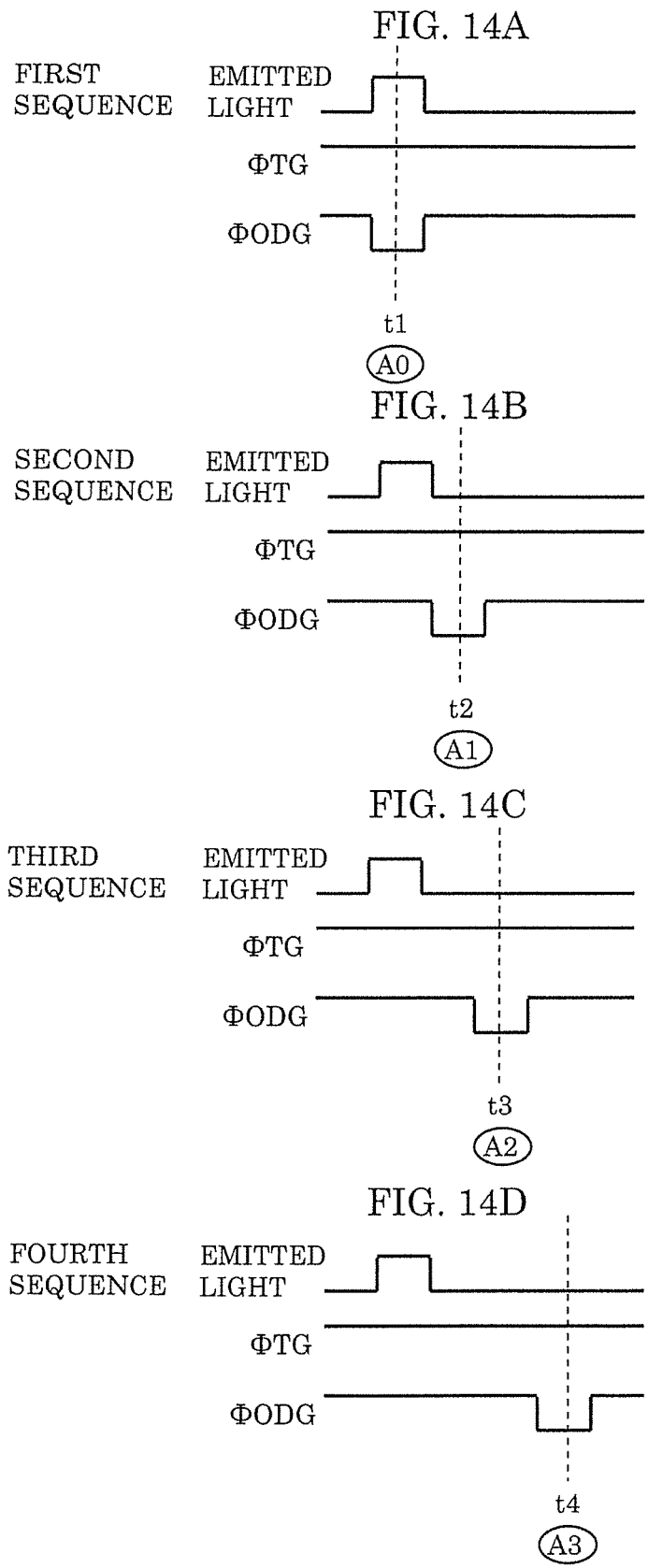
FIG. 14A is a driving timing chart illustrating operations in the exposure period of the solid-state imaging device according to Basic Embodiment 3.
FIG. 14B is a driving timing chart illustrating operations in the exposure period of the solid-state imaging device according to Basic Embodiment 3.
FIG. 14C is a driving timing chart illustrating operations in the exposure period of the solid-state imaging device according to Basic Embodiment 3.
FIG. 14D is a driving timing chart illustrating operations in the exposure period of the solid-state imaging device according to Basic Embodiment 3.

In the first sequence illustrated in FIG. 14A, all pixels 13A in image capturing unit 101 simultaneously accumulate signal charge A0 obtained at time t1, and repeat this accumulation a plurality of times. At this time, signal charge A0 read out from photoelectric converter 1 of first pixel 13Aa and signal charge A0 read out from photoelectric converter 1 of second pixel 13Ab are added under first transfer electrode 3e of second pixel 13Ab (VG5-$m$), first transfer electrode 3f of second pixel 13Ab (VG6-$m$), and first transfer electrode 3a of first pixel 13Aa (VG1-$m$), as indicated by the part of FIG. 13 corresponding to the first sequence.

Although not illustrated, a six-phase drive pulse is applied to first transfer electrodes 3, and the signal charges are transferred downward in the column direction, for all pixels 13A in image capturing unit 101 simultaneously when transitioning from the first sequence to the second sequence.

In the second sequence illustrated in FIG. 14B, all pixels 13A in image capturing unit 101 simultaneously accumulate signal charge A1 obtained at time t2, and repeat this accumulation a plurality of times. At this time, signal charge A1 read out from photoelectric converter 1 of first pixel 13Aa and signal charge A1 read out from photoelectric converter 1 of second pixel 13Ab are added under first transfer electrode 3e of second pixel 13Ab (VG5-$m$), first transfer electrode 3f of second pixel 13Ab (VG6-$m$), and first transfer electrode 3a of first pixel 13Aa (VG1-$m$), as indicated by the part of FIG. 13 corresponding to the second sequence.

Although not illustrated, a six-phase drive pulse is applied to first transfer electrodes 3, and the signal charges are transferred downward in the column direction, for all pixels 13A in image capturing unit 101 simultaneously when transitioning from the second sequence to the third sequence.

In the third sequence illustrated in FIG. 14C, all pixels 13A in image capturing unit 101 simultaneously accumulate signal charge A2 obtained at time t3, and repeat this accumulation a plurality of times. At this time, signal charge A2 read out from photoelectric converter 1 of first pixel 13Aa and signal charge A2 read out from photoelectric converter 1 of second pixel 13Ab are added under first transfer electrode 3e of second pixel 13Ab (VG5-$m$), first transfer electrode 3f of second pixel 13Ab (VG6-$m$), and first transfer electrode 3a of first pixel 13Aa (VG1-$m$), as indicated by the part of FIG. 13 corresponding to the third sequence.

Although not illustrated, a six-phase drive pulse is applied to first transfer electrodes 3, and the signal charges are transferred downward in the column direction, for all pixels 13A in image capturing unit 101 simultaneously when transitioning from the third sequence to the fourth sequence.

In the fourth sequence illustrated in FIG. 14D, all pixels 13A in image capturing unit 101 simultaneously accumulate signal charge A3 obtained at time t4, and repeat this accumulation a plurality of times. At this time, signal charge A3 read out from photoelectric converter 1 of first pixel 13Aa and signal charge A3 read out from photoelectric converter 1 of second pixel 13Ab are added under first transfer electrode 3e of second pixel 13Ab (VG5-$m$), first transfer electrode 3f of second pixel 13Ab (VG6-$m$), and first transfer electrode 3a of first pixel 13Aa (VG1-$m$), as indicated by the part of FIG. 13 corresponding to the fourth sequence.

Although not illustrated, a six-phase drive pulse is applied to first transfer electrodes 3, and the signal charges are transferred upward in the column direction, for all pixels 13A in image capturing unit 101 simultaneously when transitioning from the fourth sequence to the first sequence.

In the exposure period, each of the first to fourth sequences repeated a plurality of times is taken as a single set, and the set is repeated a plurality of times.

In this manner, in the exposure period within a single frame period, potentials of each of the corresponding first transfer electrodes 3 change in the same manner for all of the plurality of pixels 13A.

Figure 15:
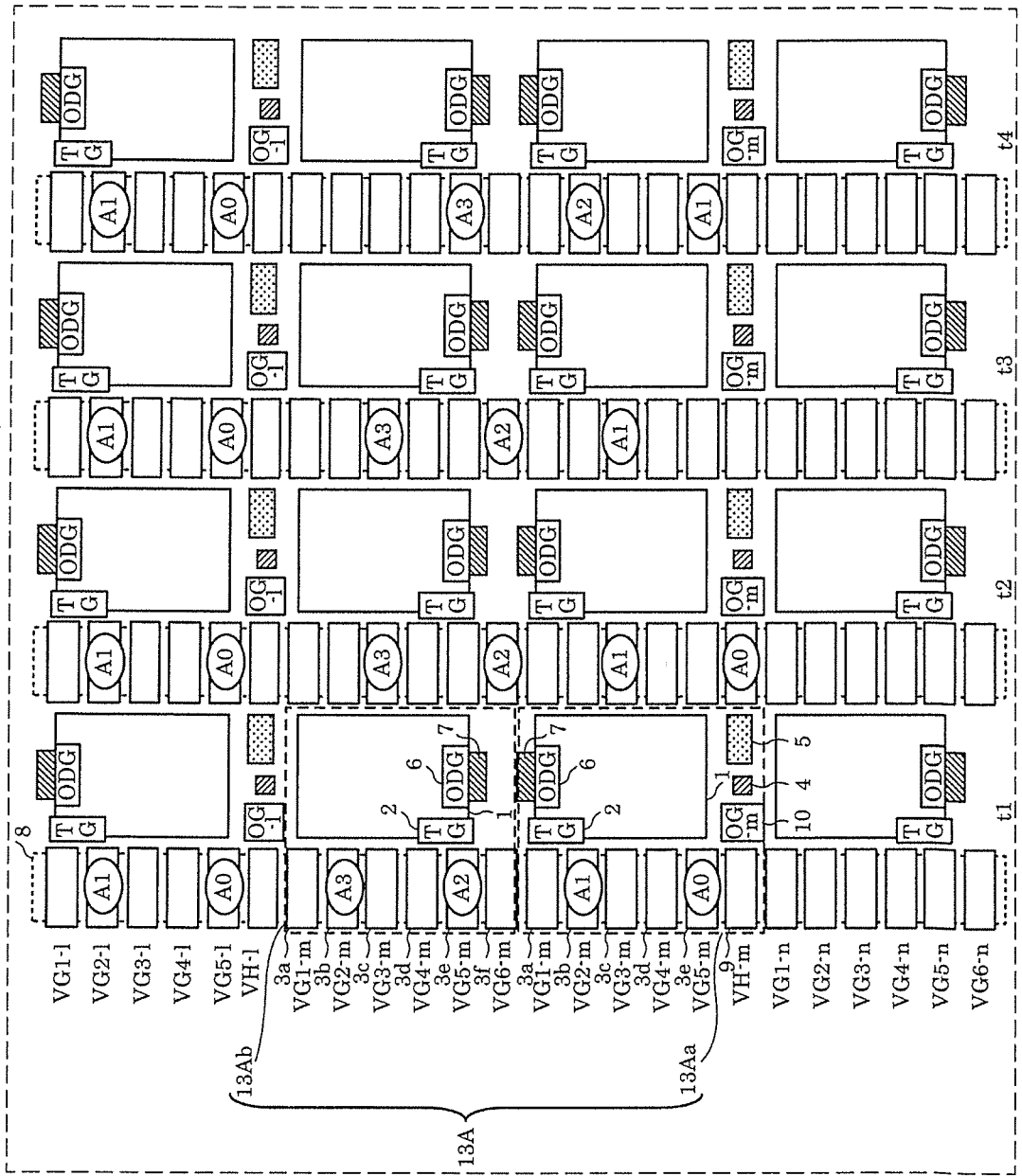
FIG. 15 is a schematic plan view illustrating operations in a transfer period of the solid-state imaging device according to Basic Embodiment 3.
Figure 16:
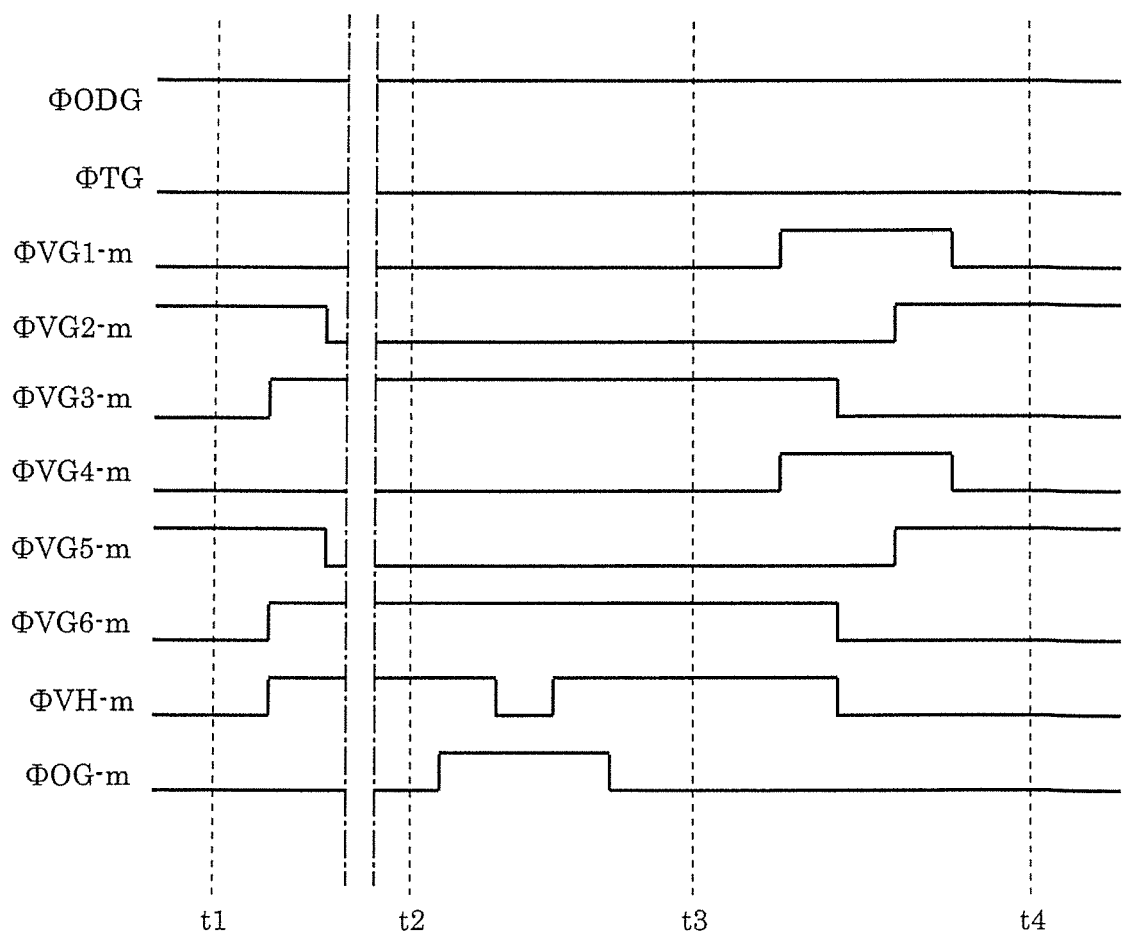
FIG. 16 is a driving timing chart illustrating operations in the transfer period of the solid-state imaging device according to Basic Embodiment 3.

FIG. 15 is a schematic plan view illustrating operations during the transfer period of the solid-state imaging device according to Basic Embodiment 3, and FIG. 16 is a driving timing chart illustrating operations during the transfer period of the solid-state imaging device according to Basic Embodiment 3.

Operations during the transfer period will be described next with reference to FIGS. 15 and 16.

Focusing on row m (the second row from the top and the third row from the top in FIG. 15), at initial time t1, first transfer electrodes 3b (VG2-m in FIG. 11) and first transfer electrodes 3e (VG5-m in FIG. 11) are in the high state, and signal charges A0 to A3 are accumulated under first transfer electrodes 3b and first transfer electrodes 3e.

Next, signal charges A0 to A3 are transferred downward in the column direction (t2) in response to a six-phase drive pulse being applied to first transfer electrodes 3a to 3f and second transfer electrode 9 in row m (VG1-m to VG6-m and VH-m in FIG. 11).

Next, signal charge A0 is transferred to floating diffusion layer 4 (t3) in response to drive pulses being applied to second transfer electrode 9 (VH-m in FIG. 11) and output control electrode 10 (OG-m in FIG. 11) in row m. Although not illustrated here, signal charge A0 transferred to floating diffusion layer 4 is read out via readout circuit 5.

Next, signal charges A1 to A3 are transferred downward in the column direction (t4) in response to a six-phase drive pulse being applied to first transfer electrodes 3a to 3f and second transfer electrode 9 in row m (VG1-m to VG6-m and VH-m in FIG. 11).

Next, although not illustrated, signal charges A1, A2, and A3 are read out in the same manner as signal charge A0 by repeating the operations from t1 to t4, and the distance to the subject is calculated using signal charges A0 to A3.

Here, unlike the exposure period, in the transfer period, during the period in which pixels 13A in row m operate (the second row from the top and the third row from the top in FIG. 15), only pixels 13A in row m operate, and the operations of the other pixels 13A are stopped.

According to the solid-state imaging device of Basic Embodiment 3 as described thus far, by adding the signal charges read out from two photoelectric converters 1 adjacent in the vertical direction under first transfer electrodes 3, the sensitivity characteristics of the solid-state imaging device can be improved more than with solid-state imaging device 100 according to Basic Embodiment 1. Furthermore, multi-phase driving (e.g., six-phase driving) can be carried out by first transfer electrodes 3 having added the signal charges, and a plurality of types (e.g., four types) of signal charges can be accumulated in a plurality of (e.g., two) pixels 13A. As such, the solid-state imaging device according to Basic Embodiment 3 can be used in a rangefinding camera.

Basic Embodiment 4 of the Present Disclosure

A solid-state imaging device according to Basic Embodiment 4 of the present disclosure will be described next, focusing on the differences from Basic Embodiment 3.

Figure 17:
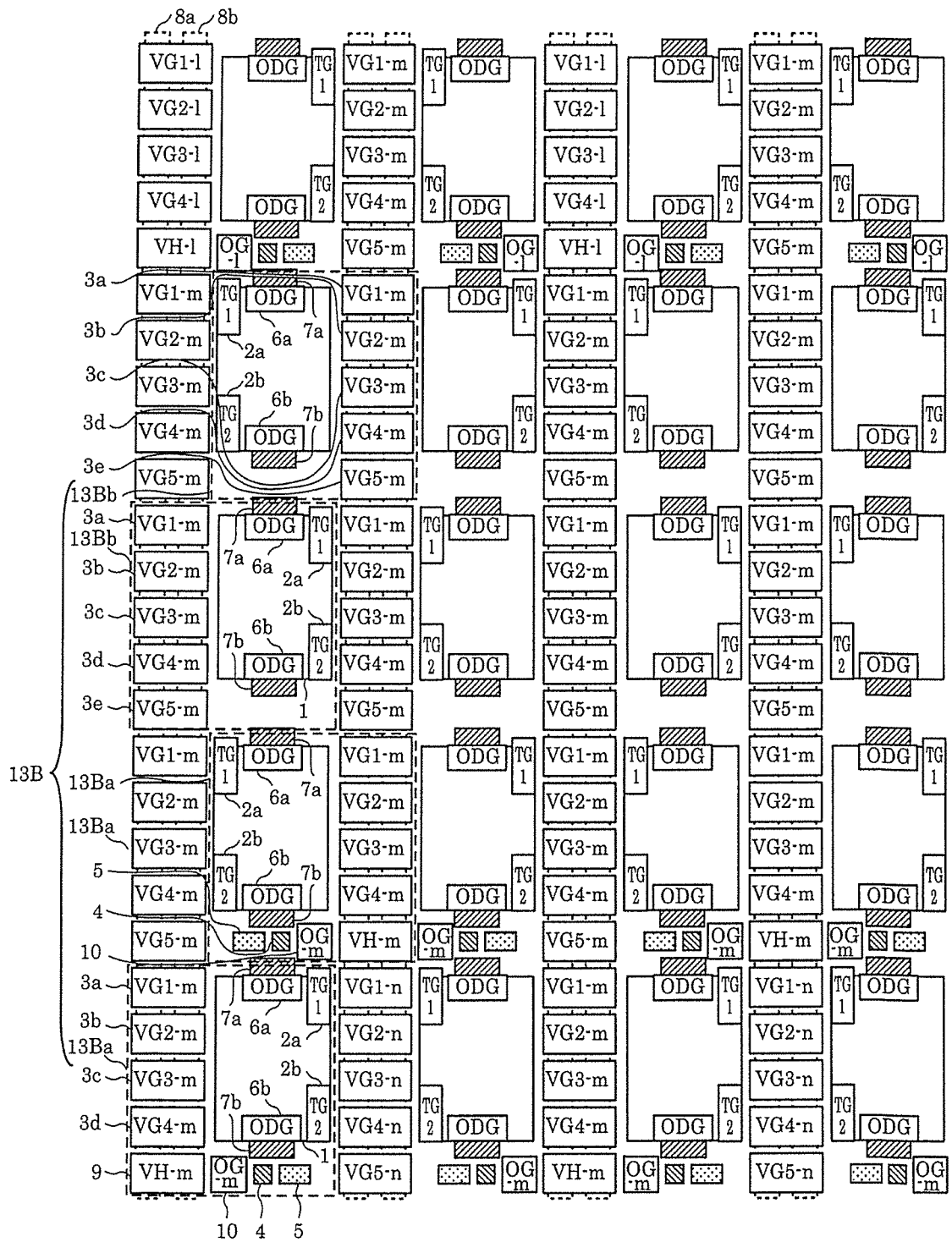
FIG. 17 is a schematic plan view illustrating a layout of pixels included in a solid-state imaging device according to Basic Embodiment 4.

FIG. 17 is a schematic plan view illustrating a layout of pixels 13B included in the solid-state imaging device according to Basic Embodiment 4. Compared to Basic Embodiment 3, in the solid-state imaging device according to Basic Embodiment 4, first pixels 13Aa according to Basic Embodiment 3 are changed to first pixels 13Ba, and second pixels 13Ab according to Basic Embodiment 3 are changed to second pixels 13Bb.

First pixel 13Ba is configured by removing first transfer electrode 3e from first pixel 13Aa according to Basic Embodiment 3. Furthermore, whereas first pixel 13Aa according to Basic Embodiment 3 includes a single transfer channel 8, first pixel 13Ba includes two transfer channels 8, namely transfer channel 8a and transfer channel 8b. In other words, first pixel 13Ba includes k (where k is an integer greater than or equal to two; two is used here) transfer channels (here, transfer channels 8a and 8b), so that the k (here, two) transfer channels 8 (here, transfer channels 8a and 8b) running under respective ones of a plurality of first transfer electrodes 3 and accumulating signal charges are disposed side-by-side in the row direction of the matrix in which the plurality of pixels 13B are disposed.

As illustrated in FIG. 17, first pixels 13Ba are disposed so as to be flipped on a column-by-column and row-by-row basis in the matrix in which the plurality of pixels 13B are disposed. As a result, (1) second transfer electrodes 9 of first pixels 13Ba adjacent in the row direction transfer signal charges in the row direction in mutually-opposite directions with respect to the row direction; (2) the order in which output control electrode 10, floating diffusion layer 4, and readout circuit 5 included in each first pixel 13Ba are disposed with respect to the row direction is flipped on a column-by-column and row-by-row basis; and (3) output control electrodes 10 at identical potentials are disposed adjacent to both ends of second transfer electrode 9 with respect to the row direction.

Additionally, although first pixel 13Aa according to Basic Embodiment 3 includes one readout electrode 2, one exposure control electrode 6, and one charge emitter 7 for a single photoelectric converter 1, first pixel 13Ba includes two readout electrodes 2, namely readout electrode 2a and readout electrode 2b, two exposure control electrodes 6, namely exposure control electrode 6a and exposure control electrode 6b, and two charge emitters 7, namely charge emitter 7a and charge emitter 7b, for a single photoelectric converter 1. Here, with respect to photoelectric converter 1, a positional relationship between readout electrode 2a and readout electrode 2b, a positional relationship between exposure control electrode 6a and exposure control electrode 6b, and a positional relationship between charge emitter 7a and charge emitter 7b, are symmetrical with respect to the column direction.

Second pixel 13Bb is configured by removing first transfer electrode 3f from second pixel 13Ab according to Basic Embodiment 3. Furthermore, whereas second pixel 13Ab according to Basic Embodiment 3 includes a single transfer channel 8, second pixel 13Bb includes two transfer channels 8, namely transfer channel 8a and transfer channel 8b. In other words, second pixel 13Bb includes k (where k is an integer greater than or equal to two; two is used here) transfer channels (here, transfer channels 8a and 8b), so that the k (here, two) transfer channels (here, transfer channels 8a and 8b) running under respective ones of a plurality of first transfer electrodes 3 and accumulating signal charges are disposed side-by-side in the row direction of the matrix in which the plurality of pixels 13B are disposed.

As illustrated in FIG. 17, second pixels 13Bb are disposed so as to be flipped on a column-by-column and a row-by-row basis in the matrix in which the plurality of pixels 13B are disposed.

Additionally, although second pixel 13Ab according to Basic Embodiment 3 includes one readout electrode 2, one exposure control electrode 6, and one charge emitter 7 for a single photoelectric converter 2, second pixel 13Bb includes two readout electrodes 2, namely readout electrode 2a and readout electrode 2b, two exposure control electrodes 6, namely exposure control electrode 6a and exposure control electrode 6b, and two charge emitters 7, namely charge emitter 7a and charge emitter 7b, for a single photoelectric converter 1. Here, with respect to photoelectric converter 1, a positional relationship between readout electrode 2a and readout electrode 2b, a positional relationship between exposure control electrode 6a and exposure control electrode 6b, and a positional relationship between charge emitter 7a and charge emitter 7b, are symmetrical with respect to the column direction.

Second pixel 13Bb shares floating diffusion layer 4 with one of first pixels 13Ba arranged in the column direction.

In pixels 13B having the above-described configuration, a charge accumulator is formed by first transfer electrodes 3 and second transfer electrode 9 to which a high voltage is applied and transfer channels 8a and 8b provided under those electrodes. Here, the descriptions will be given assuming that each charge accumulator is driven in five phases as an example. Accordingly, four types of signal charges can be accumulated in a single pixel. In addition, a plurality of (e.g., two) readout electrodes 2, a plurality of (e.g., two) exposure control electrodes 6, and a plurality of (e.g., two) charge emitters 7 are included for a single photoelectric converter 1.

As a result, two types of signal charges can be accumulated in a single exposure sequence, which makes it possible to suppress the number of times the pulsed infrared light is emitted and, by extension, reduce the amount of power consumed by light emission.

Additionally, as described above, the order in which output control electrode 10, floating diffusion layer 4, and readout circuit 5 included in each first pixel 13Ba are disposed with respect to the row direction is flipped on a column-by-column and row-by-row basis in the horizontal direction.

Accordingly, the arrangement of signal charges A0 to A3 can be aligned within a single horizontal scanning period.

In FIG. 17, electrodes given the same reference sign (e.g., VG1-m, VG2-m, VG3-m, VG4-m, and so on) are connected to the same control line.

Figure 18:
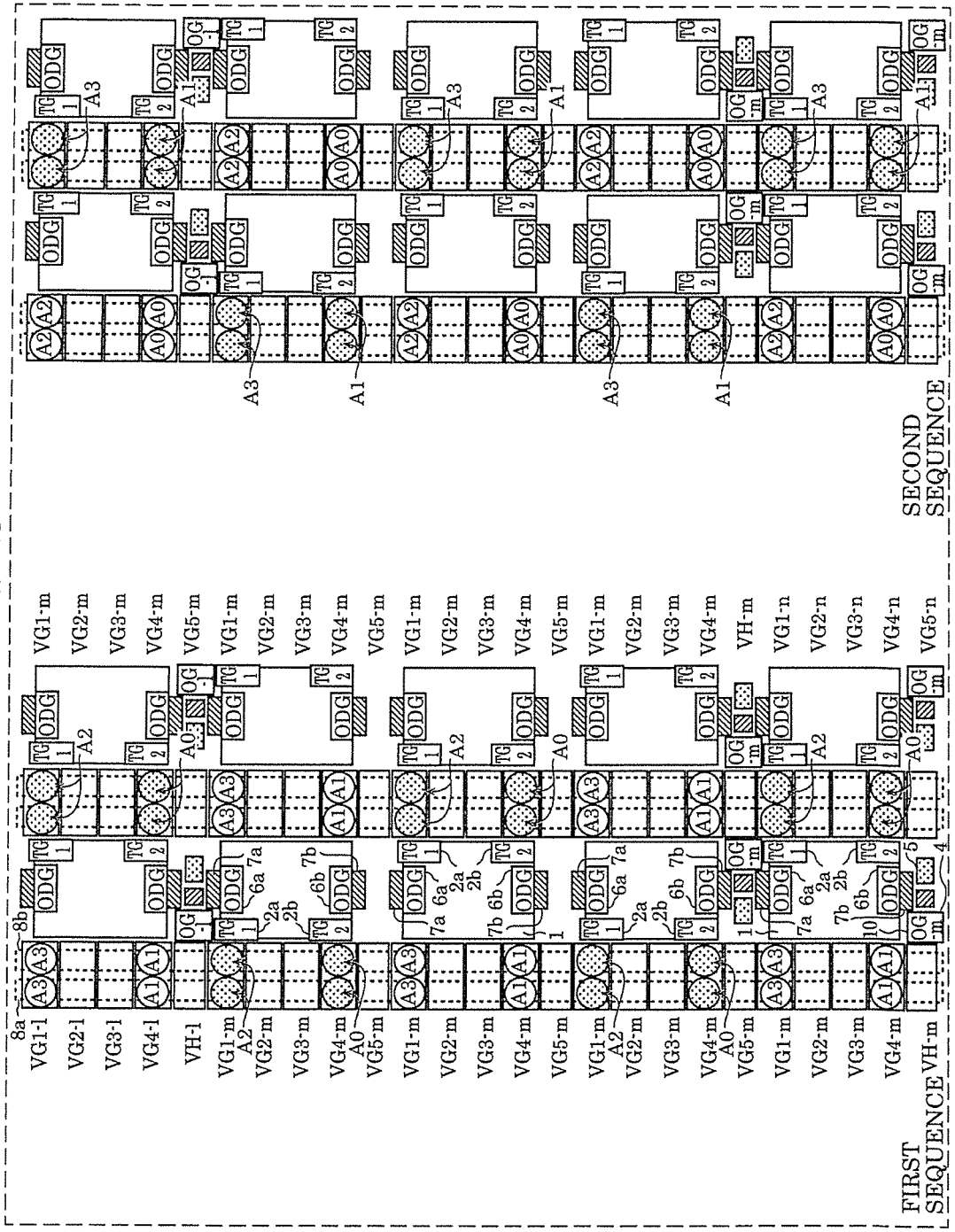
FIG. 18 is a schematic plan view illustrating operations in an exposure period of the solid-state imaging device according to Basic Embodiment 4.
Figure 19A:
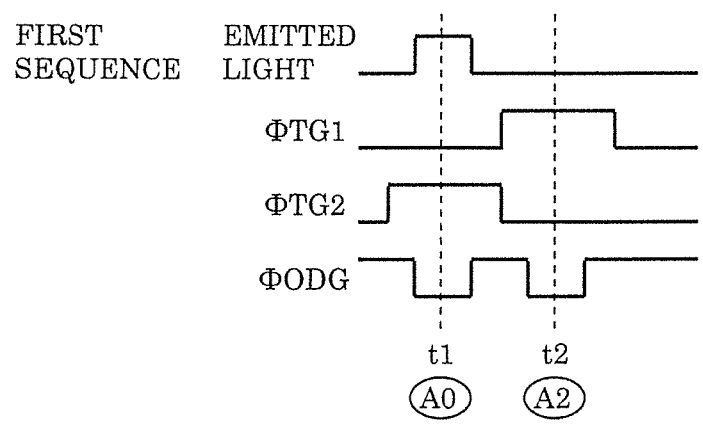
FIG. 19A is a driving timing chart illustrating operations in the exposure period of the solid-state imaging device according to Basic Embodiment 4.
Figure 19B:
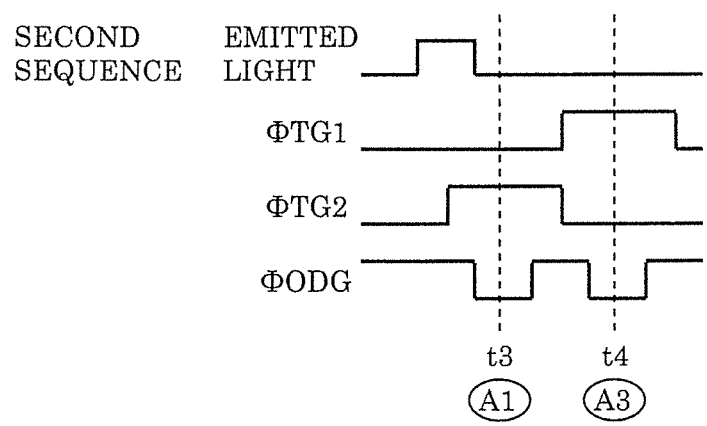
FIG. 19B is a driving timing chart illustrating operations in the exposure period of the solid-state imaging device according to Basic Embodiment 4.

FIG. 18 is a schematic plan view illustrating operations during an exposure period of the solid-state imaging device according to Basic Embodiment 4, and FIGS. 19A and 19B are driving timing charts illustrating operations during the exposure period of the solid-state imaging device according to Basic Embodiment 4.

Operations of the solid-state imaging device according to Basic Embodiment 4 during the exposure period will be described next with reference to FIGS. 18, 19A, and 19B.

Drive pulse ΦODG is applied to each of exposure control electrodes 6; and drive pulses ΦTG1 and ΦTG2, to each readout electrode 2. Although not illustrated in FIGS. 18, 19A, and 19B, during exposure, a high voltage is applied for applied pulse ΦVG1 of first transfer electrode 3a and applied pulse ΦVG4 of first transfer electrode 3d, and a low voltage is applied for the applied pulse of the other first transfer electrodes 3. The charges can be accumulated under first transfer electrodes 3 to which the high voltage has been applied, and a charge accumulator is formed. Additionally, pulsed infrared light that repeatedly turns on and off at a constant cycle is repeatedly emitted from light source 500.

In an initial state, exposure control electrode 6 is in the high state and readout electrode 2 is in the low state, and the signal charge generated by photoelectric converter 1 is output to charge emitter 7 via exposure control electrode 6.

In the first and second sequences illustrated in FIGS. 19A and 19B, the timings of drive pulses ΦODG, ΦTG1, and ΦTG2, which are synchronized with the emitted light, are different.

In the first sequence illustrated in FIG. 19A, signal charge A0 obtained at time t1 and signal charge A2 obtained at time t2 are accumulated, and this is repeated a plurality of times.

Although not illustrated, a five-phase drive pulse is applied to first transfer electrodes 3, and the signal charges are transferred downward in the column direction, for all pixels 13B in image capturing unit 101 simultaneously when transitioning from the first sequence to the second sequence.

In the second sequence illustrated in FIG. 19B, signal charge A1 obtained at time t3 and signal charge A3 obtained at time t4 are accumulated, and this is repeated a plurality of times.

Although not illustrated, a five-phase drive pulse is applied to first transfer electrodes 3, and the signal charges are transferred upward in the column direction, for all pixels 13B in image capturing unit 101 simultaneously when transitioning from the second sequence to the first sequence.

In the exposure period, each of the first and second sequences repeated a plurality of times is taken as a single set, and the set is repeated a plurality of times.

In this manner, in the exposure period within a single frame period, potentials of each of the corresponding first transfer electrodes 3 change in the same manner for all of the plurality of pixels 13B.

Figure 20:
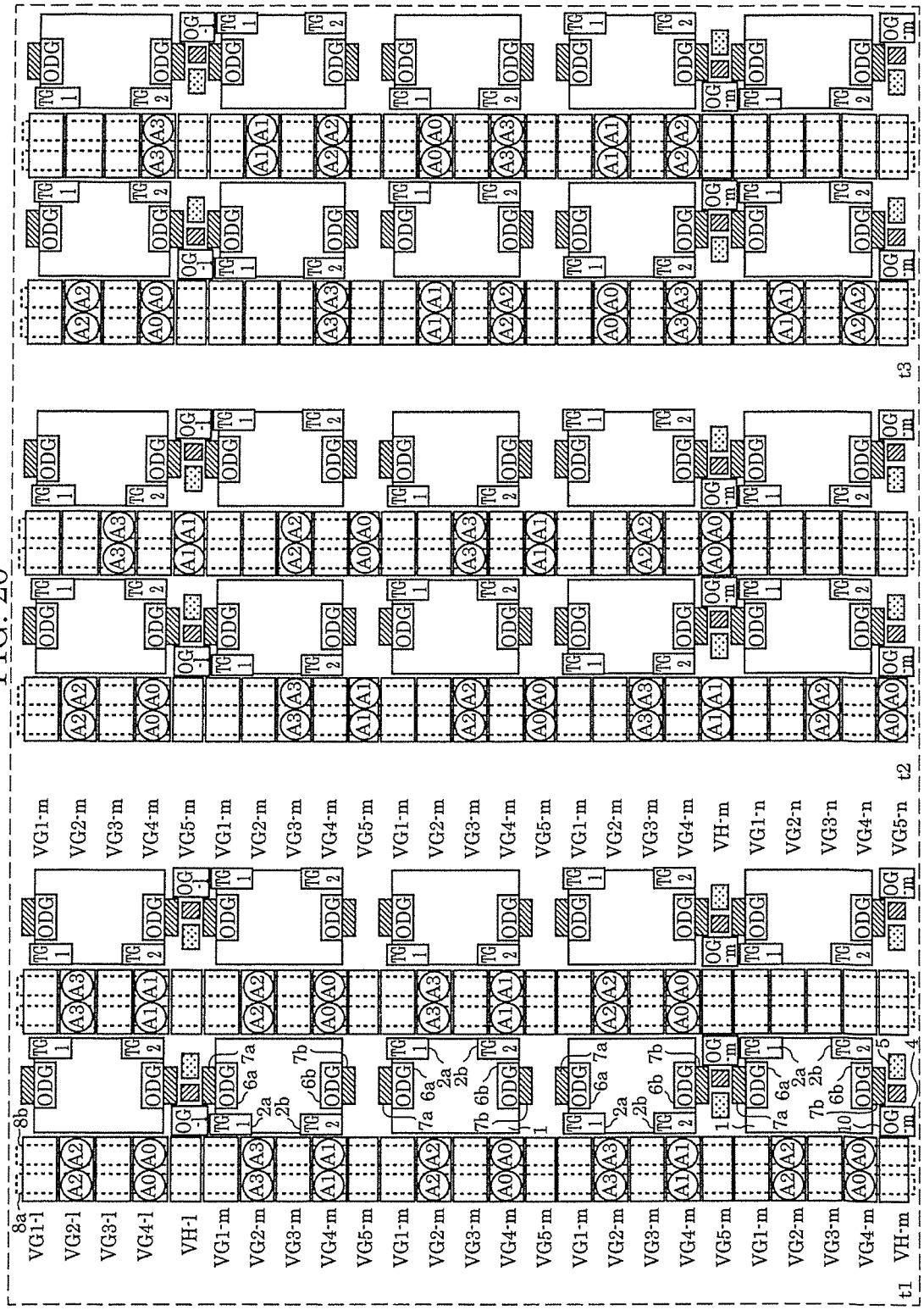
FIG. 20 is a schematic plan view illustrating operations in a transfer period of the solid-state imaging device according to Basic Embodiment 4.
Figure 21:
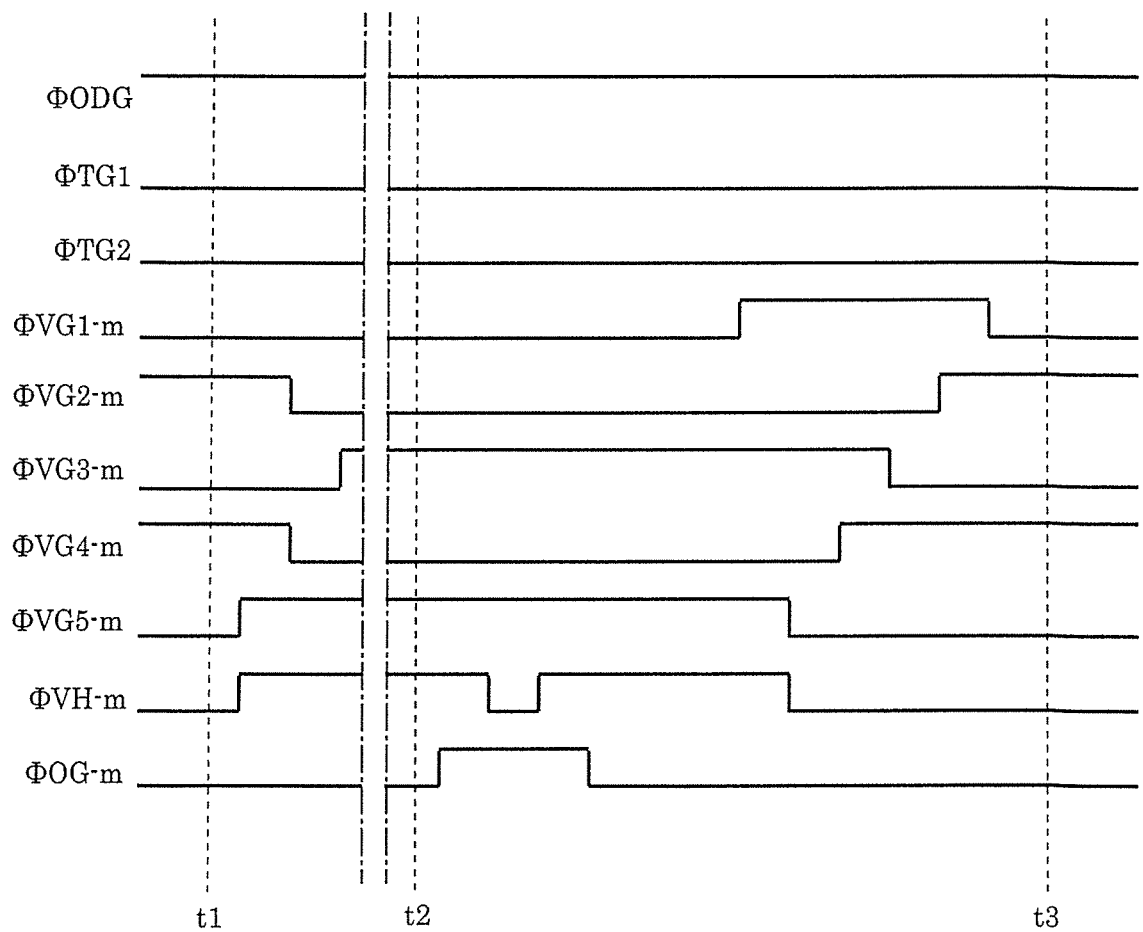
FIG. 21 is a driving timing chart illustrating operations in the transfer period of the solid-state imaging device according to Basic Embodiment 4.

FIG. 20 is a schematic plan view illustrating operations during the transfer period of the solid-state imaging device according to Basic Embodiment 4, and FIG. 21 is a driving timing chart illustrating operations during the transfer period of the solid-state imaging device according to Basic Embodiment 4.

Operations of the solid-state imaging device according to Basic Embodiment 4 during the transfer period will be described next with reference to FIGS. 20 and 21.

Focusing on row m (the second row from the top to the fifth row from the top in the column on the left side in FIG. 20, and the first row from the top to the fourth row from the top in the column on the right side in FIG. 20), at initial time t1, first transfer electrodes 3b (VG2-m in FIG. 17) and first transfer electrodes 3d (VG4-m in FIG. 17) are in the high state, and signal charges A0 to A3 are accumulated under first transfer electrodes 3b and first transfer electrodes 3d.

Next, signal charges A0 to A3 are transferred downward in the column direction (t2) in response to a five-phase drive pulse being applied to first transfer electrodes 3a to 3e and second transfer electrode 9 in row m (VG1-m to VG5-m and VH-m in FIG. 17).

Next, signal charge A0 is transferred to floating diffusion layer 4 in response to drive pulses being applied to second transfer electrode 9 (VH-m in FIG. 17) and output control electrode 10 (OG-m in FIG. 17) in row m, and signal charge A0 transferred to floating diffusion layer 4 is read out via readout circuit 5.

Next, signal charges A0 to A3 are transferred downward in the column direction (t3) in response to a five-phase drive pulse being applied to first transfer electrodes 3a to 3e and second transfer electrode 9 in row m (VG1-m to VG5-m and VH-m in FIG. 17).

Next, although not illustrated, the remaining signal charges A0 to A3 are read out in the same manner as signal charge A0 by repeating the operations from t1 to t3, and the distance to the subject is calculated using signal charges A0 to A3.

Here, unlike the exposure period, in the transfer period, during the period in which row m operates (the second row from the top to the fifth row from the top in the column on the left side in FIG. 20, and the first row from the top to the fourth row from the top in the column on the right side in FIG. 20), only pixels 13B in row m operate, and the operations of the other pixels 13B are stopped.

According to the solid-state imaging device of Basic Embodiment 4 as described thus far, by including a plurality of (e.g., two) transfer channels 8 for each of first transfer electrodes 3, four types of signal charges can be accumulated for a single pixel, and thus a range image having a better resolution than that of the solid-state imaging device according to Basic Embodiment 3 can be obtained. Furthermore, by including a plurality of (e.g., two) readout electrodes 2, a plurality of (e.g., two) exposure control electrodes 6, and a plurality of (e.g., two) charge emitters 7 for a single photoelectric converter 1, a plurality of types (e.g., two types) of signal charges can be accumulated in a single exposure sequence. This makes it possible to suppress the number of times the pulsed infrared light is emitted and, by extension, reduce the amount of power consumed by light emission, more than with the solid-state imaging device according to Basic Embodiment 3.

Exemplary Embodiment 1

A solid-state imaging device according to Exemplary Embodiment 1 of the present disclosure will be described next, focusing on the differences from Basic Embodiment 3.

Figure 22A:
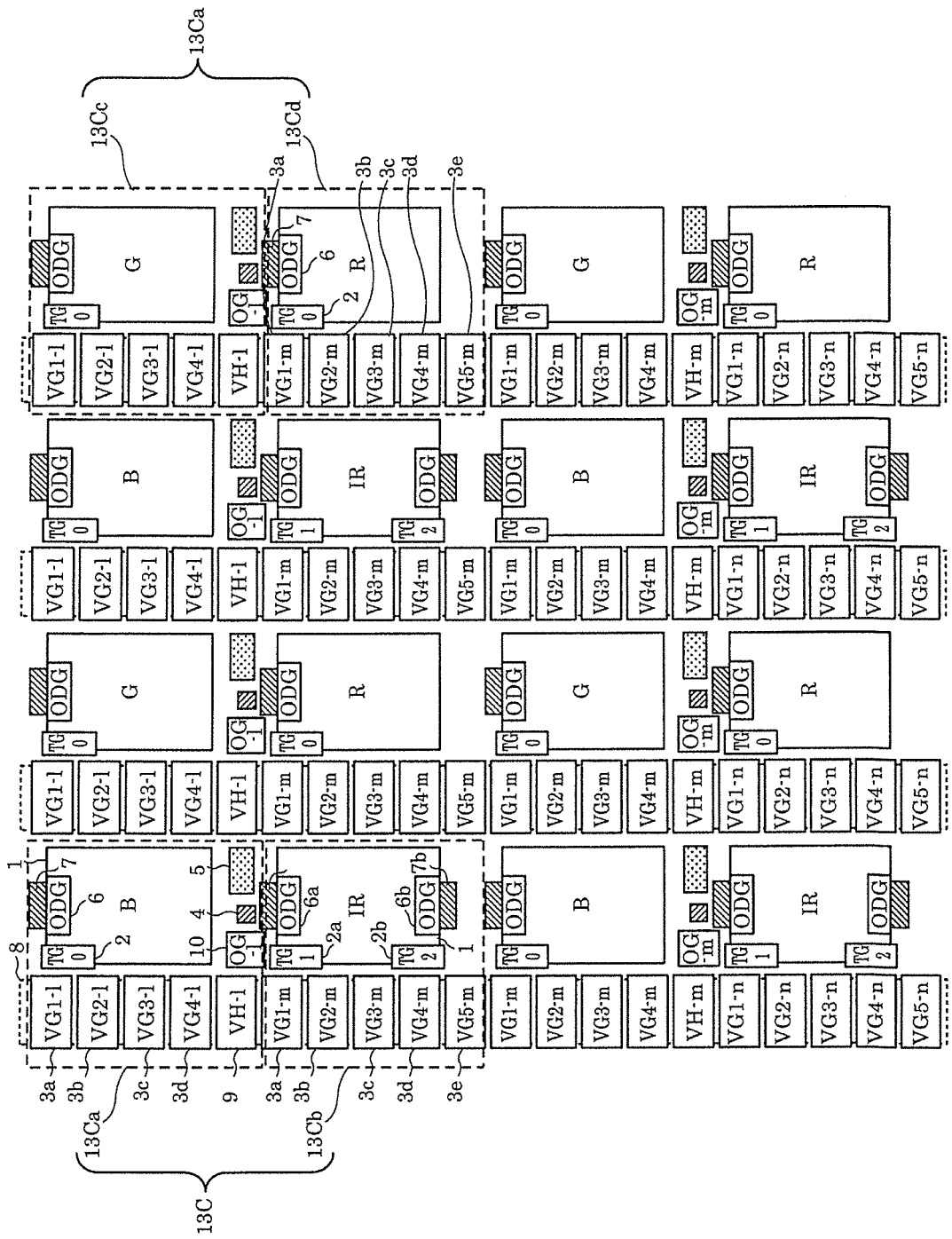
FIG. 22A is a schematic plan view illustrating a layout of pixels included in a solid-state imaging device according to Exemplary Embodiment 1.
Figure 22B:
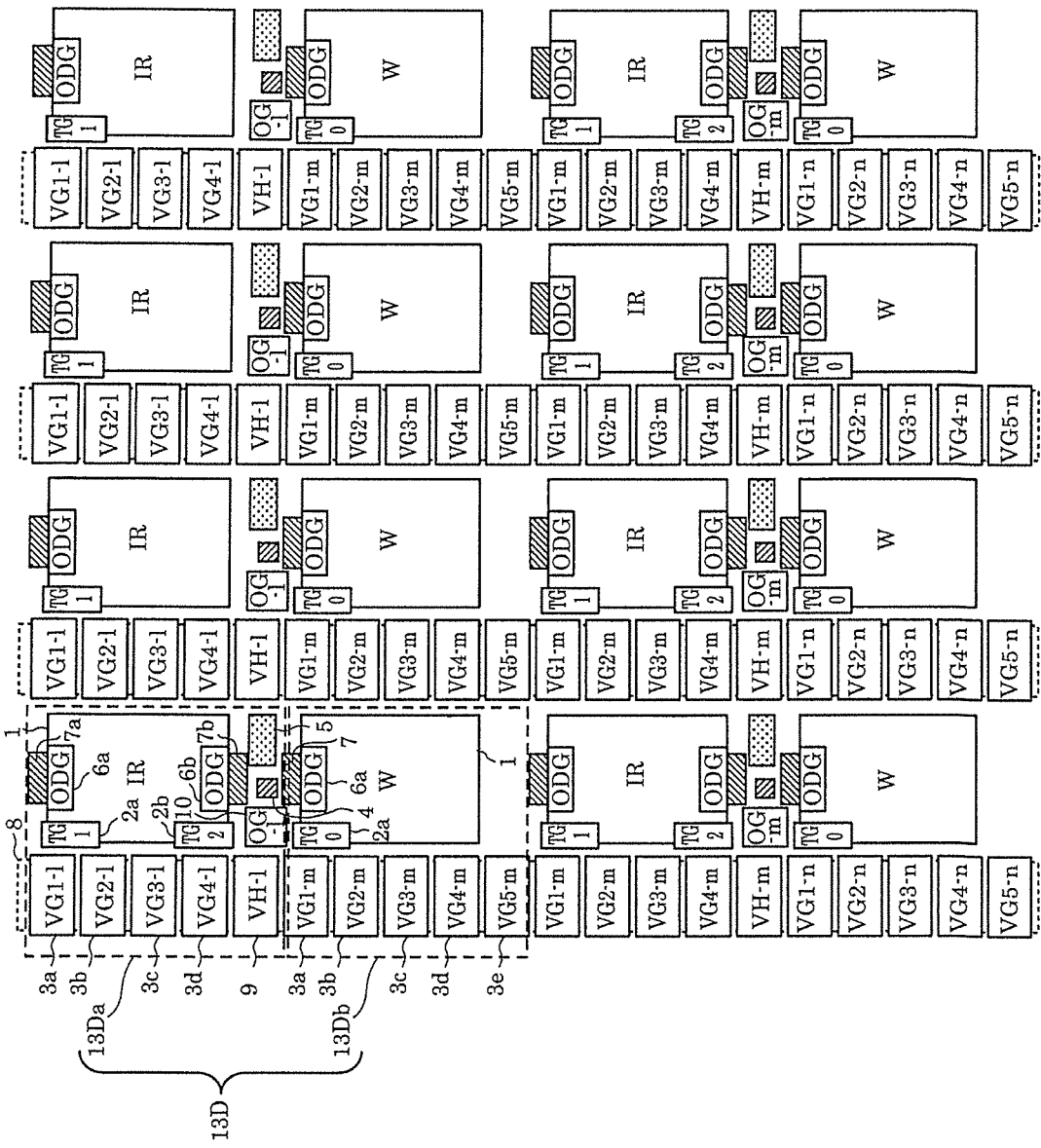
FIG. 22B is a schematic plan view illustrating a layout of pixels included in a solid-state imaging device according to a variation.

FIG. 22A is a schematic plan view illustrating a layout of pixels 13C included in a solid-state imaging device according to Exemplary Embodiment 1. FIG. 22B is a schematic plan view illustrating a layout of pixels 13D included in a solid-state imaging device according to a variation on the solid-state imaging device of Exemplary Embodiment 1.

As illustrated in FIG. 22A, the plurality of pixels 13C include a plurality of first pixels 13Ca indicated by the letters "R", "G", and "B", and a plurality of second pixels 13Cb indicated by the letters "IR".

First pixels 13Ca are pixels which receive visible light, whereas second pixels 13Cb are pixels which receive infrared light.

In FIG. 22A, the letters "R", "G", "B", and "IR" assigned to each pixel 13C indicate the type of light which reaches the pixel 13C to which that letter is assigned. Specifically, "R" indicates red light, "G" indicates green light, "B" indicates blue light, and "IR" indicates near-infrared light.

Additionally, first pixels 13Ca include a plurality of floating diffusion layer-including pixels 13Cc indicated by the letters "G" and "B", and a plurality of floating diffusion layer-lacking pixels 13Cd indicated by the letter "R".

Floating diffusion layer-including pixels 13Cc are pixels in which first transfer electrode 3e is omitted from first pixel 13Aa according to Basic Embodiment 3. These constituent elements have already been described and thus will not be mentioned here.

Floating diffusion layer-lacking pixels 13Cd are pixels in which output control electrode 10, floating diffusion layer 4, and readout circuit 5 are omitted from floating diffusion layer-including pixel 13Cc, and in which second transfer electrode 9 is changed to first transfer electrode 3e. These constituent elements have already been described and thus will not be mentioned here.

Second pixels 13Cb are pixels in which first transfer electrode 3e is omitted from second pixels 13Ab according to Basic Embodiment 3. Additionally, although second pixel 13Ab according to Basic Embodiment 3 includes one readout electrode 2, one exposure control electrode 6, and one charge emitter 7 for a single photoelectric converter 2, second pixel 13Cb includes two readout electrodes 2, namely readout electrode 2a and readout electrode 2b, two exposure control electrodes 6, namely exposure control electrode 6a and exposure control electrode 6b, and two charge emitters 7, namely charge emitter 7a and charge emitter 7b, for a single photoelectric converter 1. Here, with respect to photoelectric converter 1, a positional relationship between readout electrode 2a and readout electrode 2b, a positional relationship between exposure control electrode 6a and exposure control electrode 6b, and a positional relationship between charge emitter 7a and charge emitter 7b, are symmetrical with respect to the column direction. As such, each of second pixels 13Cb reads out a signal charge from photoelectric converter 1, in the same direction with respect to the row direction, using two readout electrodes 2 (readout electrode 2a and readout electrode 2b). These constituent elements of second pixels 13Cb have already been described and thus will not be mentioned here.

Each floating diffusion layer-lacking pixel 13Cd and second pixel 13Cb shares floating diffusion layer 4 with one of floating diffusion layer-including pixels 13Cc arranged in the column direction of the plurality of pixels 13C arranged in matrix form.

Additionally, as illustrated in FIG. 22A, a pixel, of two or more pixels arranged in the column direction and sharing at least one floating diffusion layer 4 (e.g., floating diffusion layer-including pixel 13Cc and second pixel 13Cb, or floating diffusion layer-including pixel 13Cc and floating diffusion layer-lacking pixel 13Cd), which is located at one end or another end in the column direction, is floating diffusion layer-including pixel 13Cc.

In this manner, the solid-state imaging device according to Exemplary Embodiment 1 includes first pixels 13Ca which receive visible light and second pixels 13Cb which receive infrared light, and thus both a visible image and a range image can be obtained by a single solid-state imaging device.

In pixels 13C, a charge accumulator is formed by first transfer electrodes 3 and second transfer electrode 9 to which a high voltage is applied and transfer channel 8 provided under those electrodes. Here, the descriptions will be given assuming that each charge accumulator is driven in five phases as an example.

Also, as described above, each of second pixels 13Cb includes a plurality of (e.g., two) readout electrodes 2, a plurality of (e.g., two) exposure control electrodes 6, and a plurality of (e.g., two) charge emitters 7 for a single photoelectric converter 1.

As a result, a plurality of (e.g., two) types of signal charges can be accumulated in a single exposure sequence, which makes it possible to suppress the number of times the pulsed infrared light is emitted and, by extension, reduce the amount of power consumed by light emission.

Additionally, in FIG. 22A, electrodes given the same reference sign (e.g., VG1-m, VG2-m, VG3-m, VG4-m, and so on) are connected to the same control line.

As illustrated in FIG. 22B, the plurality of pixels 13D provided in the solid-state imaging device according to the variation include a plurality of first pixels 13Da indicated by the letter "W" and a plurality of second pixels 13Db indicated by the letters "IR".

First pixels 13Da are pixels which receive visible light, whereas second pixels 13Db are pixels which receive infrared light.

In FIG. 22B, the letters "W" and "IR" assigned to each pixel 13D indicate the type of light which reaches the pixel 13C to which that letter is assigned. Specifically, "W" indicates visible light, i.e., transparent (white) light, and "I" indicates near-infrared light.

First pixels 13Da are pixels which are the same as floating diffusion layer-lacking pixels 13Cd. These constituent elements have already been described and thus will not be mentioned here.

Second pixels 13Db are pixels in which first transfer electrode 3e in second pixel 13Cb is changed to second transfer electrode 9, and output control electrode 10, floating diffusion layer 4, and readout circuit 5 have been added. These constituent elements have already been described and thus will not be mentioned here.

Figure 23:
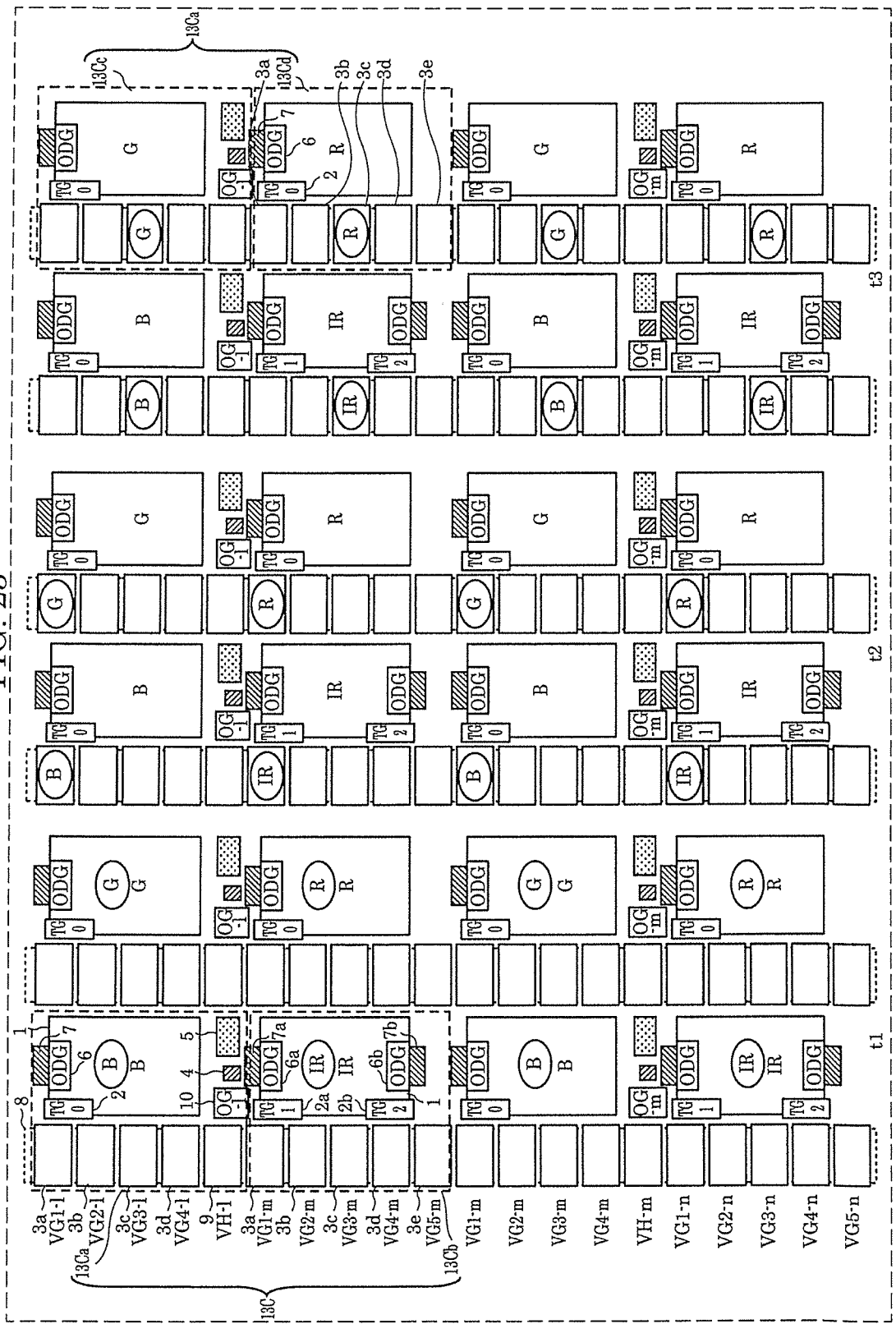
FIG. 23 is a schematic plan view illustrating operations in an exposure period of the solid-state imaging device when obtaining a visible image according to Exemplary Embodiment 1.
Figure 24:
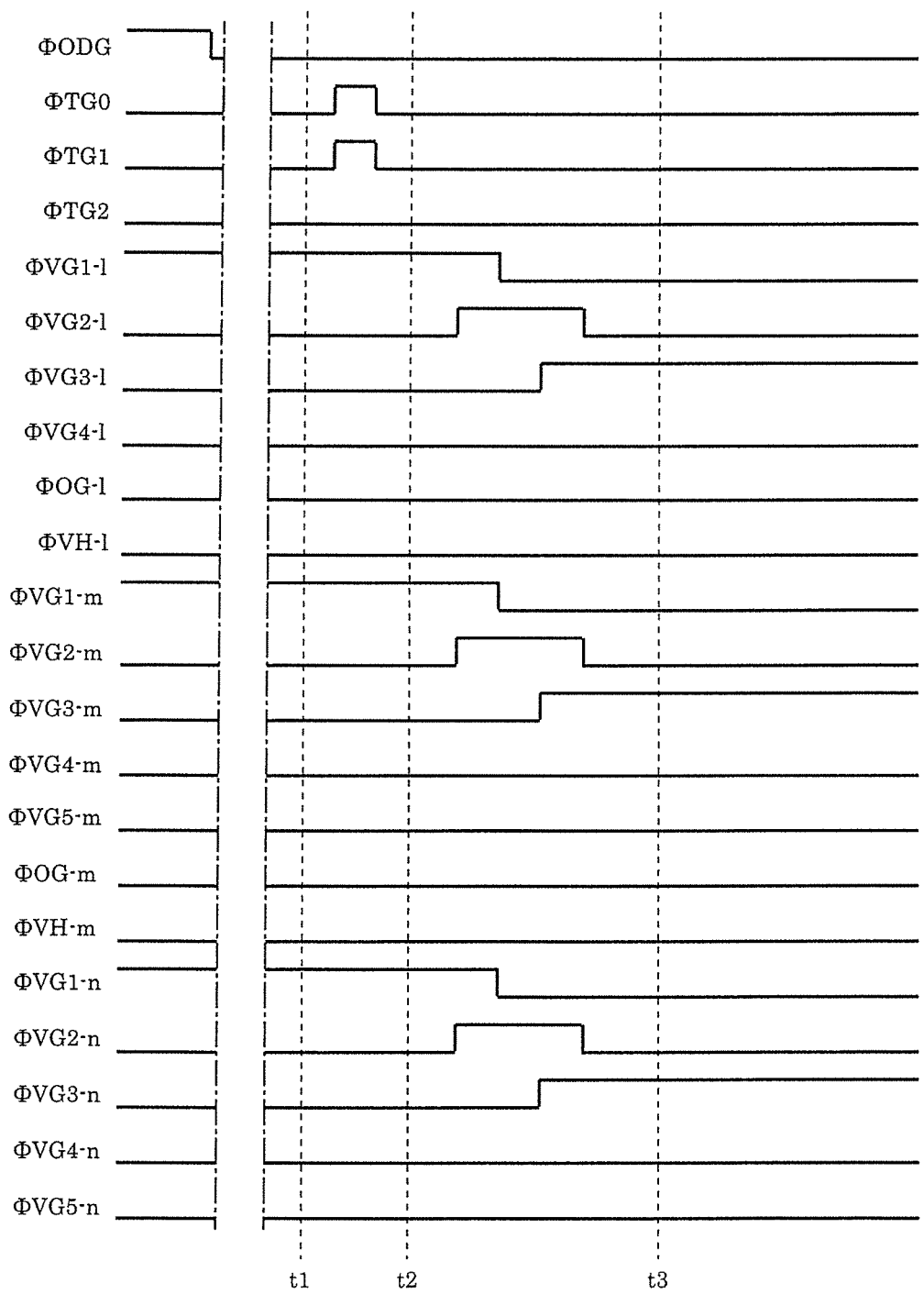
FIG. 24 is a driving timing chart illustrating operations in the exposure period of the solid-state imaging device when obtaining a visible image according to Exemplary Embodiment 1.

FIG. 23 is a schematic plan view illustrating operations during an exposure period of the solid-state imaging device according to Exemplary Embodiment 1 when obtaining a visible image, and FIG. 24 is a driving timing chart illustrating operations during the exposure period of the solid-state imaging device according to Exemplary Embodiment 1 when obtaining a visible image.

Operations of the solid-state imaging device according to Exemplary Embodiment 1 during the exposure period when obtaining a visible light image will be described next with reference to FIGS. 23 and 24.

As an initial state, drive pulse ΦODG applied to exposure control electrode 6 is in a high state, and photoelectric converter 1 is in a reset state. Additionally, ΦTG0 applied to readout electrode 2 of first pixel 13Ca, and ΦTG1 and ΦTG2 respectively applied to readout electrodes 2a and 2b of second pixel 13Cb are in the low state, and first transfer electrodes 3a held at a high state (VG1-1, VG1-m, and VG1-n in FIG. 22A) and photoelectric converter 1 are electrically disconnected. In this state, the signal charge generated by photoelectric converter 1 is output to charge emitter 7 via exposure control electrode 6, and is not accumulated in photoelectric converter 1.

Next, at time t1, exposure control electrode 6 goes to a low state, the output of the charge from photoelectric converter 1 to charge emitter 7 is stopped, and photoelectric converter 1 enters a state of accumulating the generated signal charge.

Then, at time t2, when ΦTG0 and ΦTG1 go to the high state for a set period and then return to the low state, the readout of signal charges R, G, B, and IR from photoelectric converter 1 to first transfer electrodes 3a (VG1-1, VG1-m, and VG1-n in FIG. 22A), simultaneously for all pixels 13C in image capturing unit 101, ends, and exposure control electrode 6 returns to the high state.

Next, by applying a five-phase drive pulse to first transfer electrodes 3, signal charges R, G, B, and IR are transferred under first transfer electrodes 3c VG3-m, and VG3-n in FIG. 22A), simultaneously for all pixels 13C in image capturing unit 101 (t4).

In this manner, in the exposure period within a single frame period when obtaining a visible light image, potentials of each of the corresponding first transfer electrodes 3 change in the same manner for all of the plurality of pixels 13C.

Figure 25:
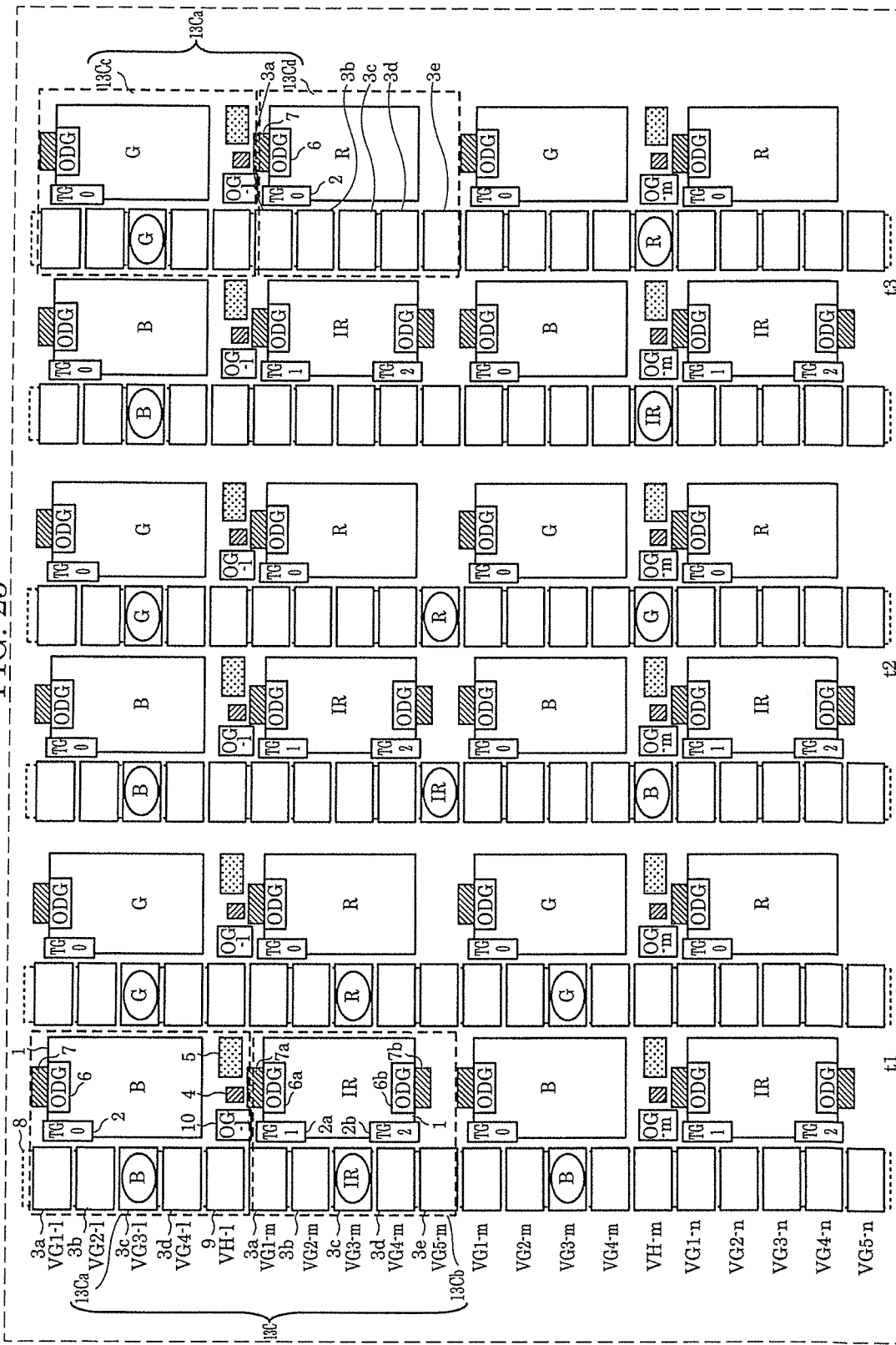
FIG. 25 is a schematic plan view illustrating operations in a transfer period of the solid-state imaging device when obtaining a visible image according to Exemplary Embodiment 1.
Figure 26:
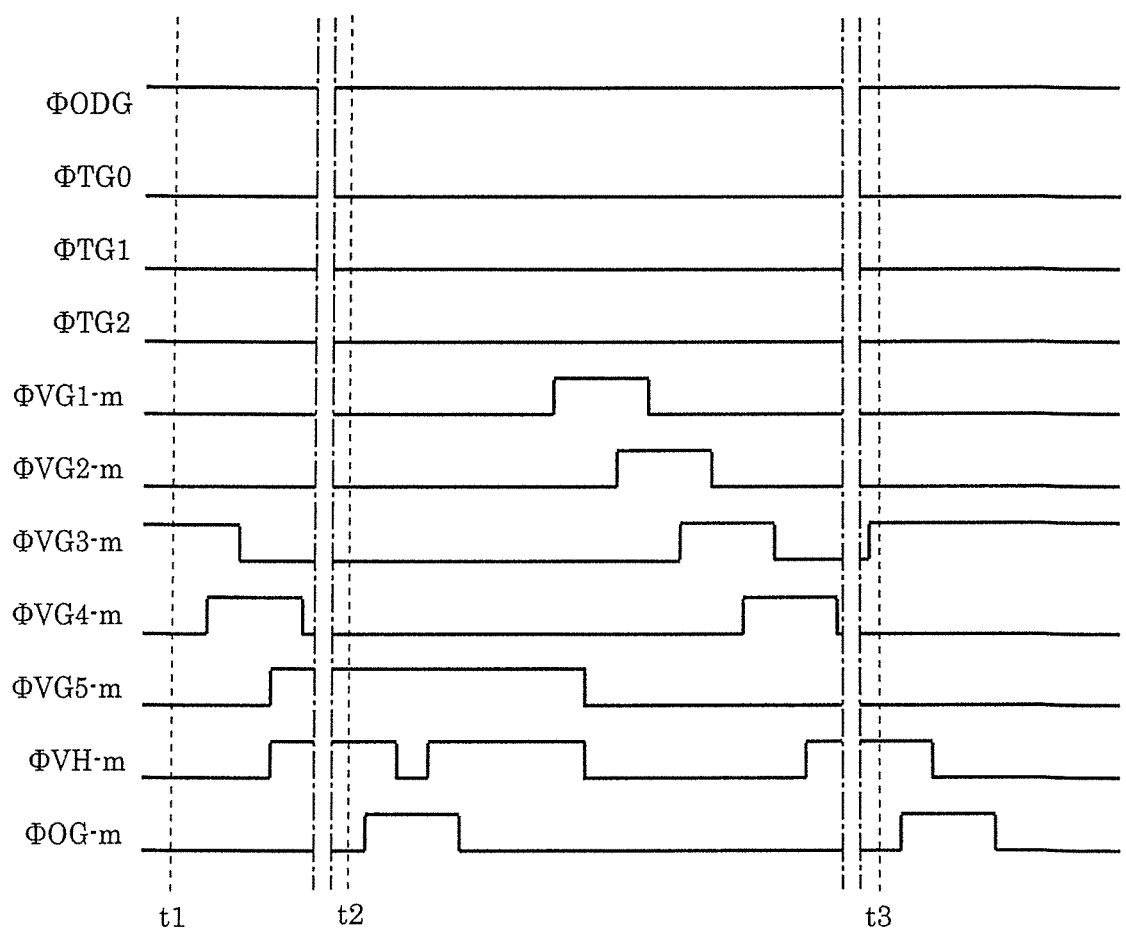
FIG. 26 is a driving timing chart illustrating operations in the transfer period of the solid-state imaging device when obtaining a visible image according to Exemplary Embodiment 1.

FIG. 25 is a schematic plan view illustrating operations during a transfer period of the solid-state imaging device according to Exemplary Embodiment 1 when obtaining a visible image, and FIG. 26 is a driving timing chart illustrating operations during the transfer period of the solid-state imaging device according to Exemplary Embodiment 1 when obtaining a visible image.

Operations of the solid-state imaging device according to Exemplary Embodiment 1 during the transfer period when obtaining a visible light image will be described next with reference to FIGS. 25 and 26.

Focusing on row m (the second row from the top and the third row from the top in FIG. 25), at initial time t1, first transfer electrodes 3c (VG3-m in FIG. 22A) are in the high state, and signal charges R, G, B, and IR are accumulated under the electrodes.

Next, by applying a five-phase drive pulse to first transfer electrodes 3a to 3e and second transfer electrode 9 in row m (VG1-m to VG5-m and VH-m in FIG. 22A), signal charges R, G, B, and IR are transferred to first transfer electrode 3e (VG5-m in FIG. 22A) and second transfer electrode 9 (VH-m in FIG. 22A) (t2).

Next, signal charges B and G are transferred to floating diffusion layer 4 in response to drive pulses being applied to second transfer electrode 9 (VH-m in FIG. 22A) and output control electrode 10 (OG-m in FIG. 22A) in row m, and signal charges B and G transferred to floating diffusion layer 4 are read out via readout circuit 5.

Next, signal charges R and IR are transferred to second transfer electrode 9 (VH-m in FIG. 22A) by applying a five-phase drive pulse to first transfer electrodes 3a to 3e and second transfer electrode 9 in row m (VG1-m to VG5-m and VH-m in FIG. 22A) (t3). Furthermore, signal charges R and IR are transferred to floating diffusion layer 4 in response to drive pulses being applied to second transfer electrode 9 (VH-m in FIG. 22A) and output control electrode 10 (OG-m in FIG. 22A) in row m, and signal charges R and IR transferred to floating diffusion layer 4 are read out via readout circuit 5.

Here, unlike the exposure period, in the transfer period, during the period in which pixels 13C in row m operate (the second row from the top and the third row from the top in FIG. 25), only pixels 13C in row m operate, and the operations of the other pixels 13C are stopped. In other words, floating diffusion layer-including pixels 13Cc are arranged in rows in which a plurality of floating diffusion layers are disposed (here, the first row from the top and the third row from the top in FIG. 22A). In the transfer period within a single frame period, potentials of the plurality of first transfer electrodes 3 which correspond to each other in pixel group units, the units constituted by floating diffusion layer-including pixels 13Cc disposed in a row in which a plurality of floating diffusion layers are disposed (here, the third row from the top in FIG. 22A) and pixels 13 sharing floating diffusion layer 4 included in those floating diffusion layer-including pixels 13Cc, change in the same manner. During a period in which the potentials of first transfer electrodes 3 are changing in one pixel group, the potentials of first transfer electrodes 3 in other pixel groups do not change.

Figure 27:
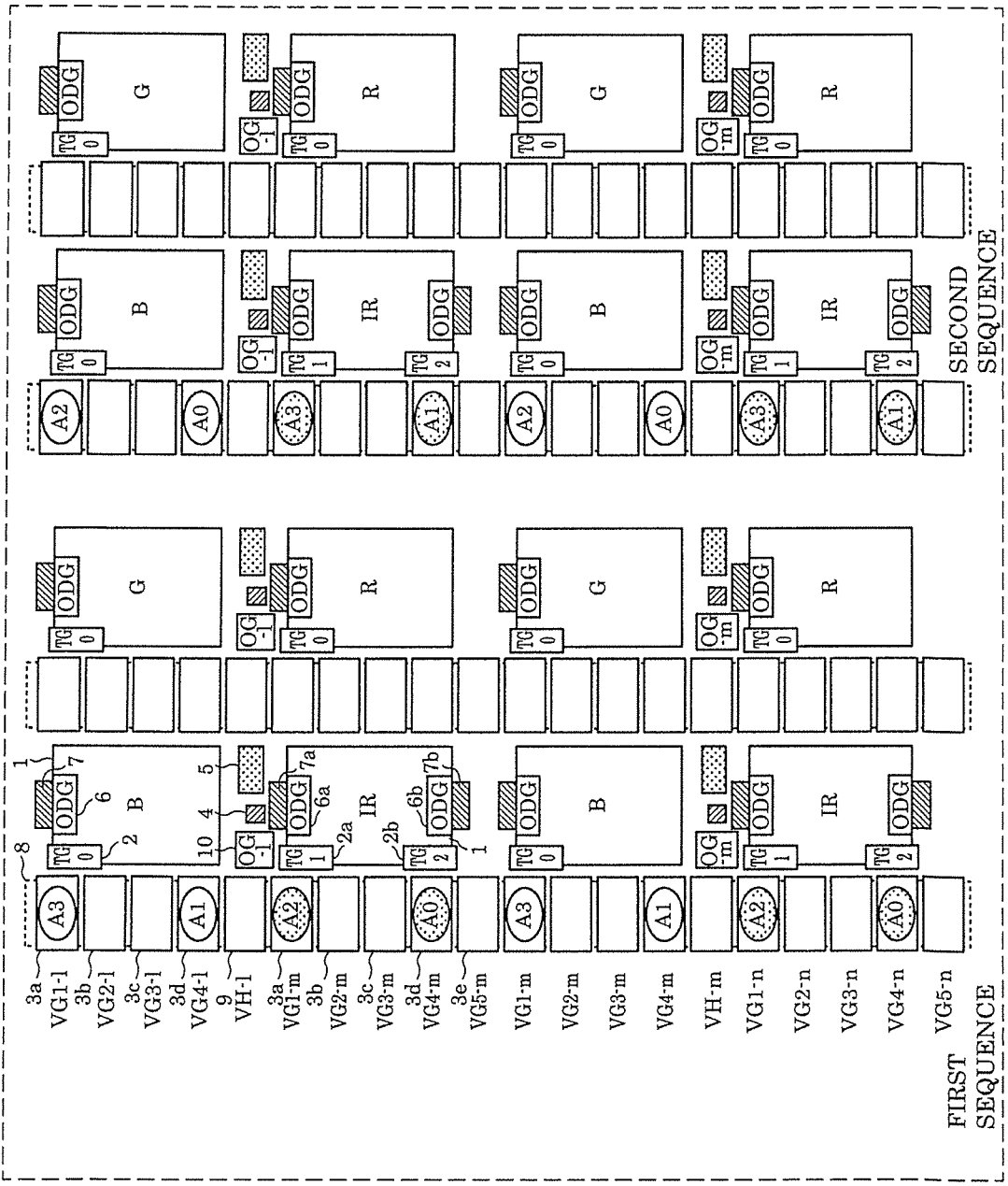
FIG. 27 is a schematic plan view illustrating operations in an exposure period of the solid-state imaging device when obtaining a range image according to Exemplary Embodiment 1.

FIG. 27 is a schematic plan view illustrating operations during the exposure period of the solid-state imaging device according to Exemplary Embodiment 1 when obtaining a range image, and driving timing charts illustrating operations in the exposure period when obtaining the range image are the same as in FIGS. 19A and 19B.

Operations of the solid-state imaging device according to Exemplary Embodiment 1 during the exposure period when obtaining a range image will be described next with reference to FIGS. 19A, 19B, and 27.

Drive pulse ΦODG is applied to each of exposure control electrodes 6a and 6b in second pixel 13Cb; and drive pulses ΦTG1 and ΦTG2, to respective ones of readout electrodes 2a and 2b in second pixel 13Cb. Although not illustrated in FIGS. 19A and 19B, in pixels 13C, a high voltage is applied for applied pulse ΦVG1 of first transfer electrode 3a and applied pulse ΦVG4 of first transfer electrode 3d, and a low voltage is applied for the applied pulse of the other first transfer electrodes 3. The charges can be accumulated under first transfer electrodes 3 to which the high voltage has been applied, and a charge accumulator is formed. Additionally, a low voltage is applied to readout electrodes 2 of first pixels 13Ca (TG0 in FIG. 22A), and signal charges are not read out from the R, G, and B pixels, i.e., from first pixels 13Ca. Additionally, pulsed infrared light that repeatedly turns on and off at a constant cycle is repeatedly emitted from light source 500.

In an initial state, exposure control electrode 6 is in the high state and readout electrode 2 is in the low state, and the signal charge generated by photoelectric converter 1 is output to charge emitter 7 via exposure control electrode 6.

In the first and second sequences illustrated in FIGS. 19A and 19B, the timings of drive pulses ΦODG, ΦTG1, and ΦTG2, which are synchronized with the emitted light, are different.

In the first sequence illustrated in FIG. 19A, signal charge A0 obtained at time t1 and signal charge A2 obtained at time t2 are accumulated, and this is repeated a plurality of times.

Although not illustrated, a five-phase drive pulse is applied to first transfer electrodes 3, and the signal charges are transferred downward in the column direction, for all pixels 13C in image capturing unit 101 simultaneously when transitioning from the first sequence to the second sequence.

In the second sequence illustrated in FIG. 19B, signal charge A1 obtained at time t3 and signal charge A3 obtained at time t4 are accumulated, and this is repeated a plurality of times.

Although not illustrated, a five-phase drive pulse is applied to first transfer electrodes 3, and the signal charges are transferred upward in the column direction, for all pixels 13C in image capturing unit 101 simultaneously when transitioning from the second sequence to the first sequence.

In the exposure period, each of the first and second sequences repeated a plurality of times is taken as a single set, and the set is repeated a plurality of times.

In this manner, in the exposure period within a single frame period, potentials of each of the corresponding first transfer electrodes 3 change in the same manner for all of the plurality of pixels 13C.

Figure 28:
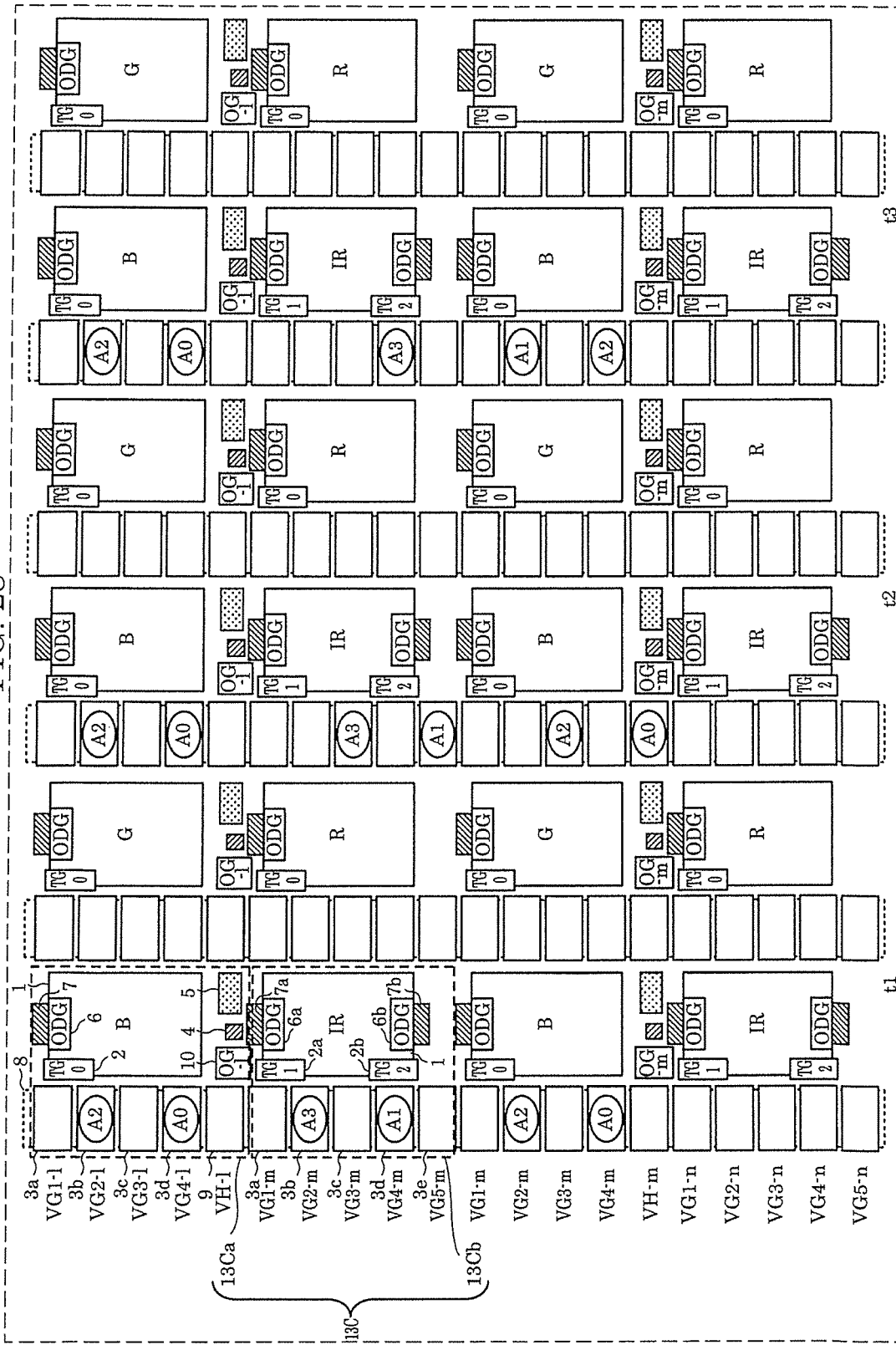
FIG. 28 is a schematic plan view illustrating operations in a transfer period of the solid-state imaging device when obtaining a range image according to Exemplary Embodiment 1.

FIG. 28 is a schematic plan view illustrating operations during a transfer period of the solid-state imaging device according to Exemplary Embodiment 1 when obtaining a range image, and a driving timing chart illustrating operations during the transfer period of the solid-state imaging device according to Exemplary Embodiment 1 when obtaining a visible image is the same as in FIG. 21.

Operations of the solid-state imaging device according to Exemplary Embodiment 1 during the transfer period when obtaining a range image will be described next with reference to FIGS. 21 and 28.

Focusing on row m (the second row from the top and the third row from the top in FIG. 28), at initial time t1, first transfer electrodes 3b (VG2-m in FIG. 22A) and first transfer electrodes 3d (VG4-m in FIG. 22A) are in the high state, and signal charges A0 to A3 are accumulated under first transfer electrodes 3b and first transfer electrodes 3d.

Next, signal charges A0 to A3 are transferred downward in the column direction (t2) in response to a five-phase drive pulse being applied to first transfer electrodes 3a to 3e and second transfer electrode 9 (VG1-m to VG5-m and VH-m in FIG. 22A).

Next, although not illustrated, signal charge A0 is transferred to floating diffusion layer 4 in response to drive pulses being applied to second transfer electrode 9 (VH-m in FIG. 22A) and output control electrode 10 (OG-m in FIG. 22A) in row m, and signal charge A0 transferred to floating diffusion layer 4 is read out via readout circuit 5.

Next, signal charges A1 to A3 are transferred downward in the column direction (t3) in response to a five-phase drive pulse being applied to first transfer electrodes 3a to 3e and second transfer electrode 9 in row m (VG1-m to VG5-m and VH-m in FIG. 22A).

Next, although not illustrated, signal charges A1 to A3 are read out in the same manner as signal charge A0 by repeating the operations from t1 to t3, and the distance to the subject is calculated using signal charges A0 to A3.

Here, unlike the exposure period, in the transfer period, during the period in which row m operates (the second row from the top and the third row from the top in FIG. 28), only pixels 13C in row m operate, and the operations of the other pixels 13C are stopped.

According to the solid-state imaging device of Exemplary Embodiment 1 as described thus far, each pixel 13C includes a filter that transmits red light (R light), green light (G light), blue light (B light), or near-infrared light (IR light) (or, in the case of the solid-state imaging device according to the variation, each pixel 13D includes a filter that transmits white light (W light) or infrared light (IR light). Thus both a visible image and a range image can be obtained by a single solid-state imaging device. Furthermore, second pixels 13Cb include a plurality of (e.g., two) readout electrodes 2, a plurality of (e.g., two) exposure control electrodes 6, and a plurality of (e.g., two) charge emitters 7 for a single photoelectric converter 1. Thus a plurality of types (e.g., two types) of signal charges can be accumulated in a single exposure sequence, which makes it possible to suppress the number of times the pulsed infrared light is emitted and, by extension, reduce the amount of power consumed by light emission.

Exemplary Embodiment 2

A solid-state imaging device according to Exemplary Embodiment 2 of the present disclosure will be described next, focusing on the differences from Exemplary Embodiment 1.

Figure 29:
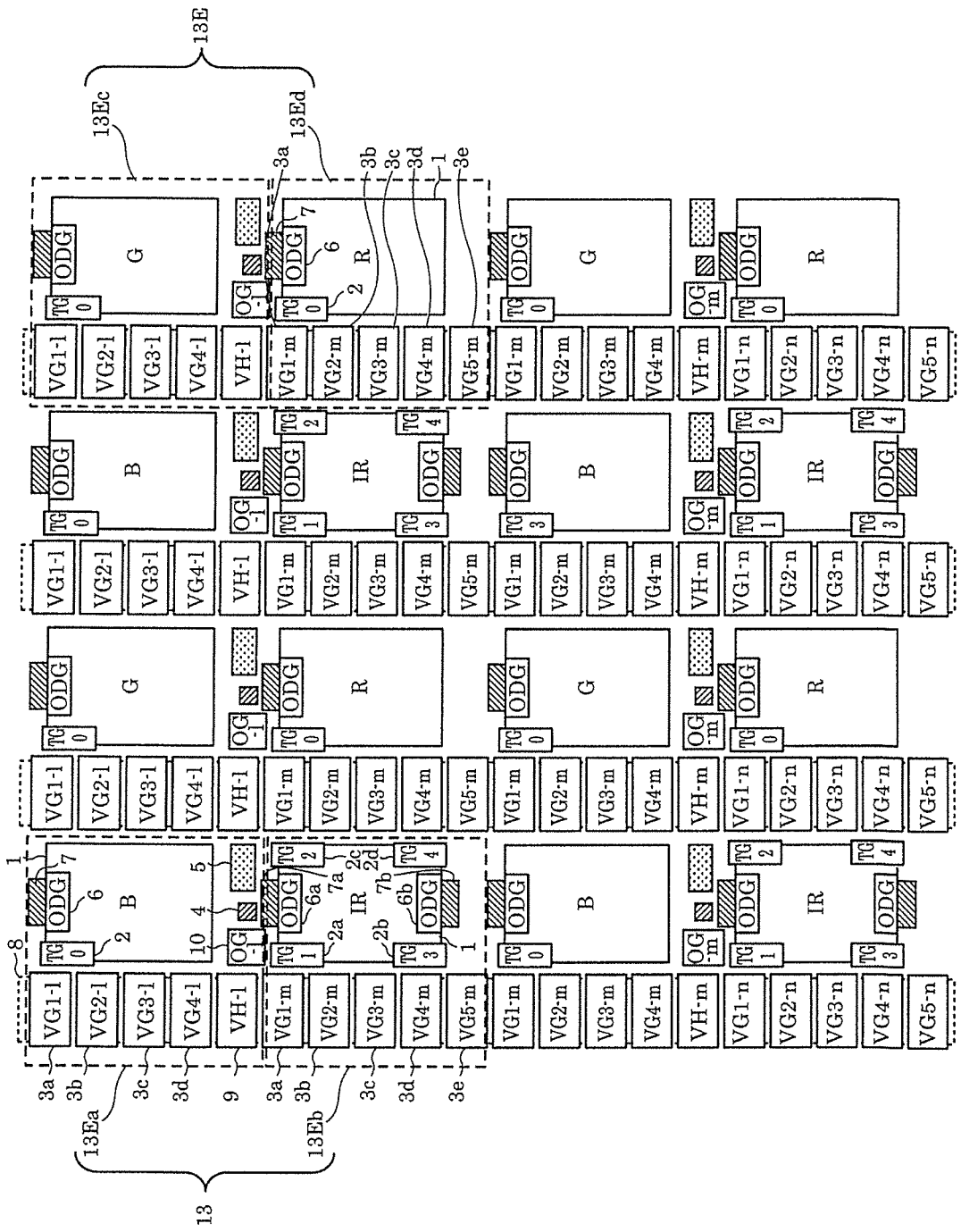
FIG. 29 is a schematic plan view illustrating a layout of pixels included in a solid-state imaging device according to Exemplary Embodiment 2.

FIG. 29 is a schematic plan view illustrating a layout of pixels 13E included in a solid-state imaging device according to Exemplary Embodiment 2. Compared to Exemplary Embodiment 1, in the solid-state imaging device according to Exemplary Embodiment 2, pixels 13C according to Exemplary Embodiment 1 are changed to pixels 13E. More specifically, second pixels 13Cb, floating diffusion layer-including pixels 13Cc, and floating diffusion layer-lacking pixels 13Cd according to Exemplary Embodiment 1 are changed to second pixels 13Eb, floating diffusion layer-including pixels 13Ec, and floating diffusion layer-lacking pixels 13Ed, respectively. Here, floating diffusion layer-including pixels 13Ec and floating diffusion layer-lacking pixels 13Ed will be called "first pixels 13Ea".

Second pixel 13Eb is configured by adding two readout electrodes 2, namely readout electrode 2c and readout electrode 2d, to second pixel 13Cb according to Exemplary Embodiment 1. In other words, second pixel 13Eb includes four readout electrodes, namely readout electrodes 2a to 2d. Here, a positional relationship of readout electrodes 2a to 2d with respect to photoelectric converter 1 has readout electrodes 2c and 2d disposed symmetrically with respect to readout electrodes 2a and 2b, respectively, in the row direction. As such, in second pixels 13Eb, signal charges are read out in a first direction (here, to the left in FIG. 29) with respect to the row direction by two readout electrodes of the four readout electrodes 2 (here, readout electrodes 2a and 2b), and signal charges are read out from photoelectric converter 1 in a second direction opposite from the first direction (here, to the right in FIG. 29) with respect to the row direction by the other two readout electrodes of the four readout electrodes 2 (here, readout electrodes 2c and 2d).

Because second pixel 13Eb includes four readout electrodes 2 for a single photoelectric converter 1 in this manner, four types of signal charges can be accumulated in a single exposure sequence, which makes it possible to suppress the number of times the pulsed infrared light is emitted and, by extension, reduce the amount of power consumed by light emission.

Floating diffusion layer-including pixels 13Ec and floating diffusion layer-lacking pixels 13Ed are the same as floating diffusion layer-including pixels 13Cc and floating diffusion layer-lacking pixels 13Cd according to Exemplary Embodiment 1, respectively. These have already been described and therefore will not be mentioned here.

Additionally, in FIG. 29, electrodes given the same reference sign (e.g., VG1-*m*, VG2-*m*, VG3-*m*, VG4-*m*, and so on) are connected to the same control line.

Operations of the solid-state imaging device according to Exemplary Embodiment 2 in an exposure period and a transfer period when obtaining a visible image are the same as the operations of the solid-state imaging device according to Exemplary Embodiment 1 in the exposure period and the transfer period when obtaining a visible image. These operations have already been described and therefore will not be mentioned here.

Figure 30:
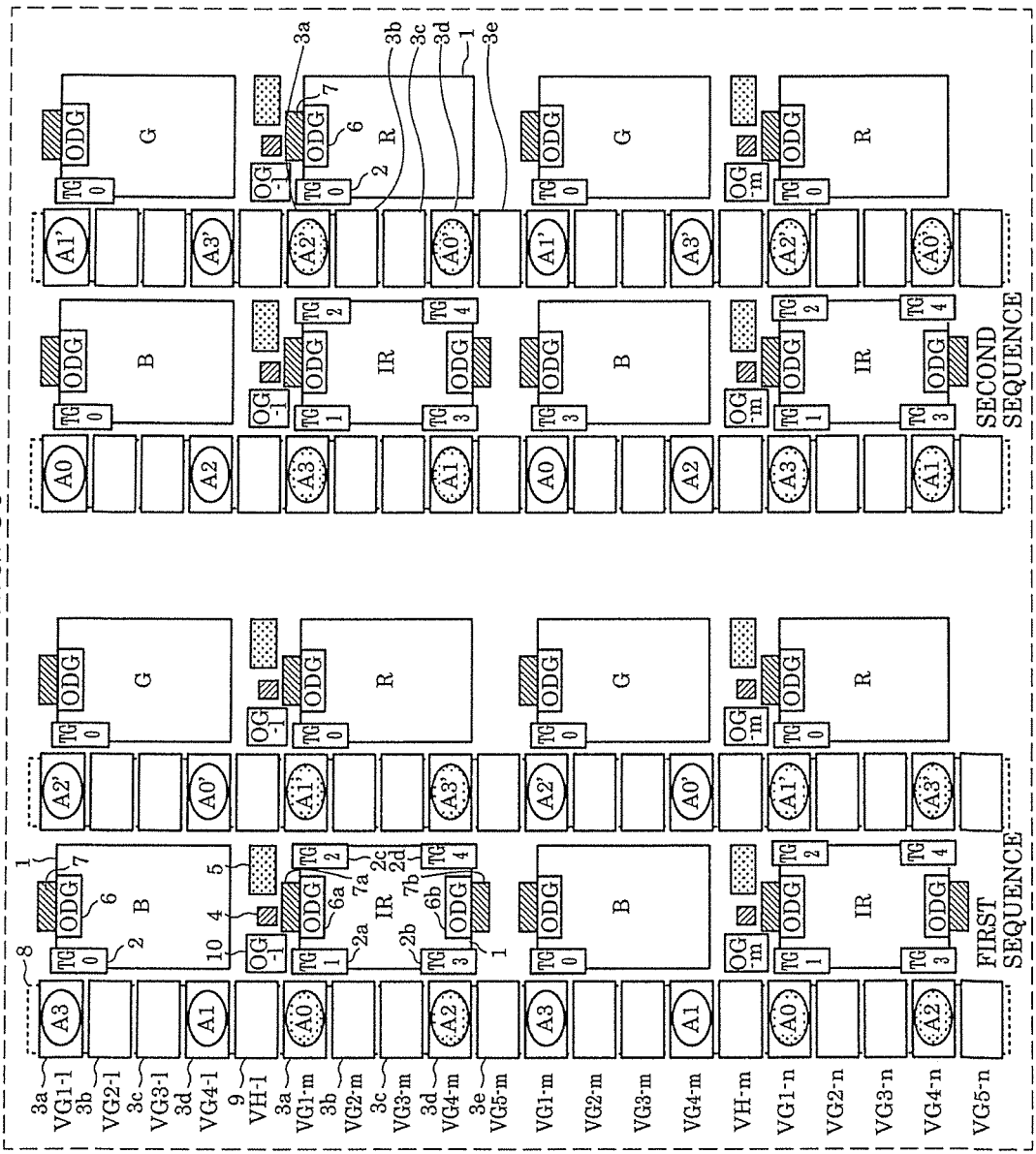
FIG. 30 is a schematic plan view illustrating operations in an exposure period of the solid-state imaging device when obtaining a range image according to Exemplary Embodiment 2.
Figure 31A:
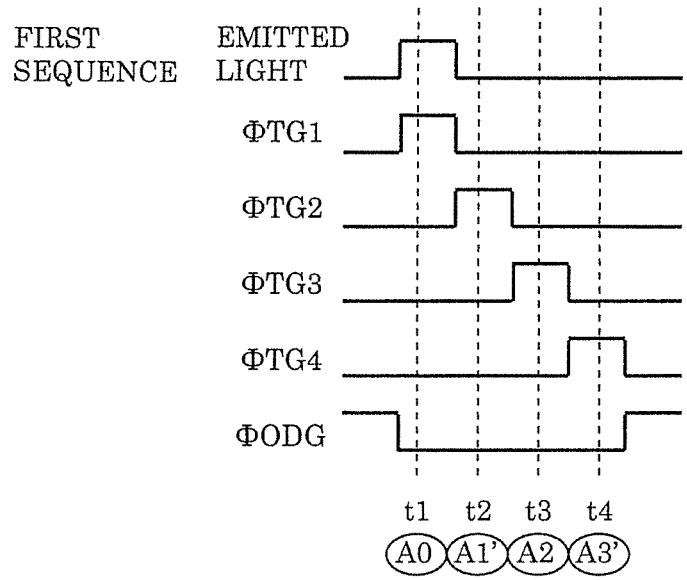
FIG. 31A is a driving timing chart illustrating operations in the exposure period of the solid-state imaging device when obtaining a range image according to Exemplary Embodiment 2.
Figure 31B:
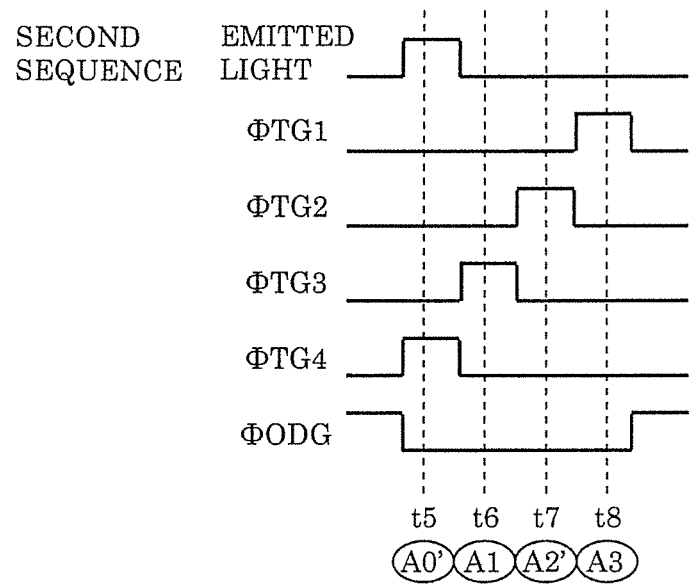
FIG. 31B is a driving timing chart illustrating operations in the exposure period of the solid-state imaging device when obtaining a range image according to Exemplary Embodiment 2.

FIG. 30 is a schematic plan view illustrating operations during the exposure period of the solid-state imaging device according to Exemplary Embodiment 2 when obtaining a range image, and FIGS. 31A and 31B are driving timing charts illustrating operations during the exposure period of the solid-state imaging device according to Exemplary Embodiment 2 when obtaining the range image.

Operations of the solid-state imaging device according to Exemplary Embodiment 2 during the exposure period when obtaining a range image will be described next with reference to FIGS. 30, 31A, and 31B.

Drive pulse ΦODG is applied to each of exposure control electrodes 6a and 6b in second pixel 13Eb; and drive pulses ΦTG1, ΦTG3, ΦTG2, and ΦTG4, to respective ones of readout electrodes 2a, 2b, 2c, and 2d in second pixel 13Eb. Although not illustrated in FIG. 30, in pixels 13E, a high voltage is applied for applied pulse ΦVG1 of first transfer electrode 3a and applied pulse ΦVG4 of first transfer electrode 3d, and a low voltage is applied for the applied pulse of the other first transfer electrodes 3. The charges can be accumulated under first transfer electrodes 3 to which the high voltage has been applied, and a charge accumulator is formed. Additionally, a low voltage is applied to readout electrodes 2 of first pixels 13Ea (TG0 in FIG. 29), and signal charges are not read out from the R, G, and B pixels, i.e., from first pixels 13Ea. Additionally, pulsed infrared light that repeatedly turns on and off at a constant cycle is repeatedly emitted from light source 500.

In an initial state, exposure control electrode 6 is in the high state and readout electrode 2 is in the low state, and the signal charge generated by photoelectric converter 1 is output to charge emitter 7 via exposure control electrode 6.

In the first and second sequences illustrated in FIGS. 31A and 31B, the timings of drive pulses ΦTG1 to ΦTG4, which are synchronized with the emitted light, are different.

In the first sequence illustrated in FIG. 31A, signal charge A0 obtained at time t3, signal charge A1' obtained at time t2, signal charge A2 obtained at time t3, and signal charge A3' obtained at time t4 are accumulated, and this is repeated a plurality of times.

Although not illustrated, a five-phase drive pulse is applied to first transfer electrodes 3, and the signal charges are transferred downward in the column direction, for all pixels 13E in image capturing unit 101 simultaneously when transitioning from the first sequence to the second sequence.

In the second sequence illustrated in FIG. 31B, signal charge A0' obtained at time t5, signal charge A1 obtained at time t6, signal charge A2' obtained at time t7, and signal charge A3 obtained at time t8 are accumulated, and this is repeated a plurality of times.

Although not illustrated, a five-phase drive pulse is applied to first transfer electrodes 3, and the signal charges are transferred upward, for all pixels 13E in image capturing unit 101 simultaneously when transitioning from the second sequence to the first sequence.

In the exposure period, each of the first and second sequences repeated a plurality of times is taken as a single set, and the set is repeated a plurality of times.

In this manner, in the exposure period within a single frame period, potentials of each of the corresponding first transfer electrodes 3 change in the same manner for all of the plurality of pixels 13C.

Figure 32:
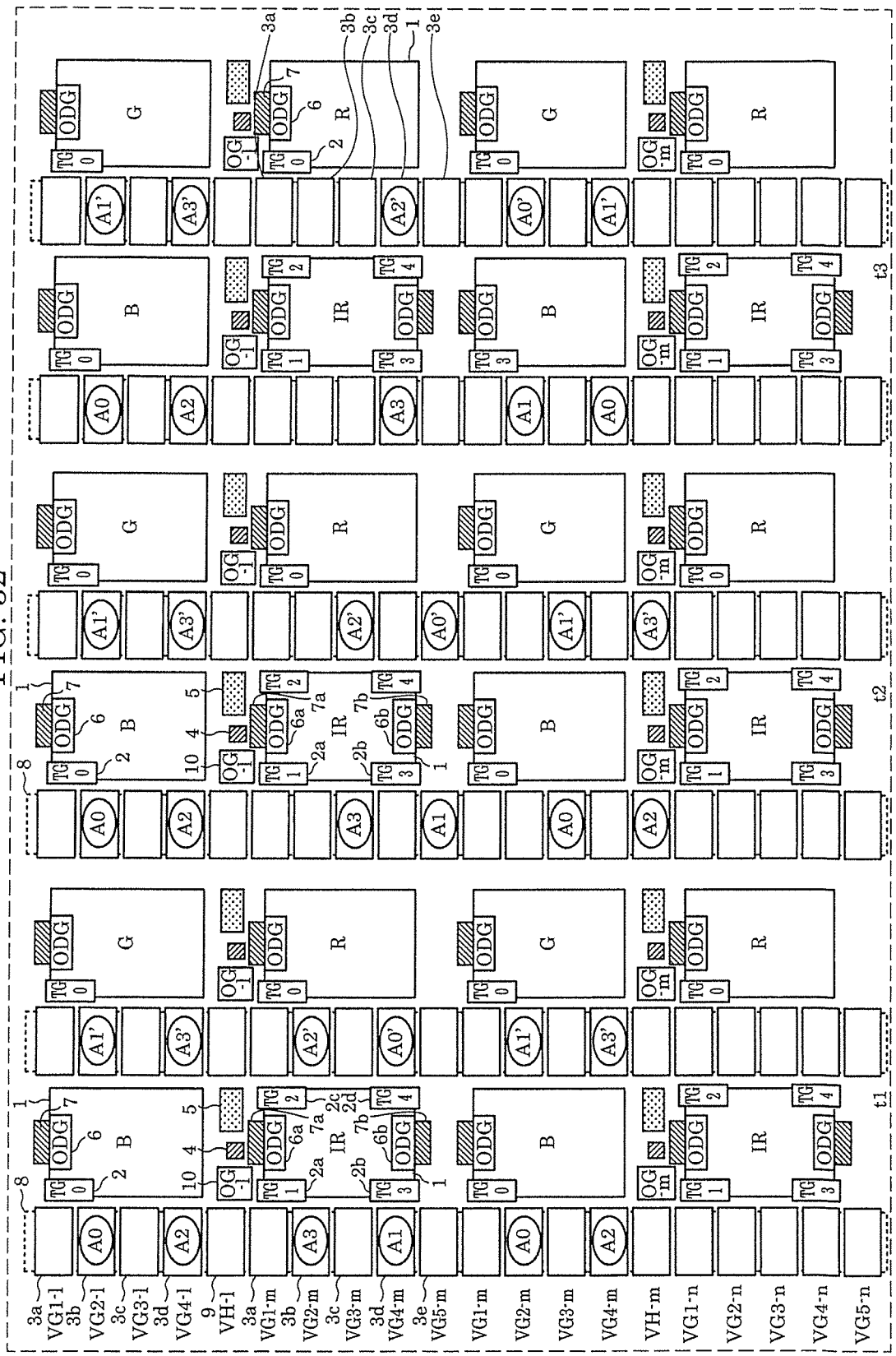
FIG. 32 is a schematic plan view illustrating operations in a transfer period of the solid-state imaging device when obtaining a range image according to Exemplary Embodiment 2.

FIG. 32 is a schematic plan view illustrating operations during a transfer period of the solid-state imaging device according to Exemplary Embodiment 2 when obtaining a range image, and a driving timing chart illustrating operations during the transfer period of the solid-state imaging device according to Exemplary Embodiment 2 when obtaining a visible image is the same as in FIG. 26.

Operations during the transfer period when obtaining a range image will be described next with reference to FIGS. 26 and 32.

Focusing on row m (the second row from the top and the third row from the top in FIG. 32), at initial time t1, first transfer electrodes 3b (VG2-*m* in FIG. 29) and first transfer electrodes 3d (VG4-*m* in FIG. 29) are in the high state, and signal charges A0 to A3 are accumulated under first transfer electrodes 3b and first transfer electrodes 3d.

Next, signal charges A0 to A3' are transferred downward in the column direction (t2) in response to a five-phase drive pulse being applied to first transfer electrodes 3a to 3e and second transfer electrode 9 (VG1-*m* to VG5-*m* and VH-m in FIG. 29).

Next, although not illustrated, signal charges A2 and A3' are transferred to floating diffusion layer 4 in response to drive pulses being applied to second transfer electrode 9 (VH-m in FIG. 29) and output control electrode 10 (OG-m in FIG. 29) in row m, and signal charges A2 and A3' transferred to floating diffusion layer 4 are read out via readout circuit 5.

Next, signal charges A0 to A2' are transferred downward in the column direction (t3) in response to a five-phase drive pulse being applied to first transfer electrodes 3a to 3e and second transfer electrode 9 in row m (VG1-*m* to VG5-*m* and VH-m in FIG. 29).

Next, although not illustrated, signal charges A0 to A2' are read out in the same manner as signal charges A2 and A3' by repeating the operations from t1 to t3. Signal charges A0 to A3 and signal charges A0' to A3' are read out via mutually-different floating diffusion layers 4 and readout circuits 5, and have different offsets and gains. As such, after the signal charges are digitized, adding together the respective signal charges A0 and A0', signal charges A1 and A1', signal charges A2 and A2', and signal charges A3 and A3', and then using the signals obtained from the adding to calculated the distance to the subject, cancels out the offset differences and gain differences.

Here, unlike the exposure period, in the transfer period, during the period in which row m operates (the second row from the top and the third row from the top in FIG. 32), only pixels 13E in row m operate, and the operations of the other pixels 13E are stopped.

According to the solid-state imaging device of Exemplary Embodiment 2 as described thus far, second pixel 13Eb includes four readout electrodes 2 for a single photoelectric converter 1 in this manner, and thus four types of signal charges can be accumulated in a single exposure sequence. This makes it possible to further suppress the number of times the pulsed infrared light is emitted and, by extension, reduce the amount of power consumed by light emission, more than with the solid-state imaging device according to Exemplary Embodiment 1.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure can be widely applied in solid-state imaging devices that obtain an image of a subject.

What is claimed is:

1. A solid-state imaging device, comprising:
a plurality of pixels arranged in matrix form having rows and columns, each of the plurality of pixels including a photoelectric converter that converts received light into a signal charge, and a first transfer electrode that accumulates and transfers the signal charge read out from the photoelectric converter; and
a control line connected in common to the first transfer electrode of each of pixels arranged in a row direction, wherein:
the plurality of pixels include a plurality of first pixels that receive visible light and a plurality of second pixels that receive infrared light,
one or more of the plurality of pixels, which form a row of the matrix form, are floating diffusion layer-including pixels each having a floating diffusion layer that accumulates the transferred signal charge, and one or more of the plurality of pixels in a row adjacent to the row of the floating diffusion layer-including pixels with respect to a column direction have no floating diffusion layer, and
the control line is connected in common to the first transfer electrode of one of the floating diffusion layer-including pixels and to the first transfer electrode of the pixels that have no floating diffusion layer, are arranged in the column direction with respect to the floating diffusion layer-including pixels and share the floating diffusion layer with the floating diffusion layer-including pixels, respectively.

2. The solid-state imaging device according to claim 1, wherein:
each of the plurality of pixels includes a plurality of first transfer electrodes, each of which is the first transfer electrode, and the solid-state imaging device comprises a plurality of control lines, each of which is the control line, respectively connected to the plurality of first transfer electrodes in each of the plurality of pixels.

3. The solid-state imaging device according to claim 1, wherein:
each of the plurality of first pixels includes a readout electrode that reads out the signal charge from the photoelectric converter, and
each of the plurality of second pixels has a plurality of readout electrodes, each of which is the readout electrode.

4. The solid-state imaging device according to claim 3, wherein:
each of the plurality of second pixels includes two readout electrodes, and
in each of the plurality of second pixels, the signal charge is read out from the photoelectric converter by the two readout electrodes in a same direction with respect to the row direction of an arrangement of the plurality of pixels.

5. The solid-state imaging device according to claim 3, wherein:
each of the plurality of second pixels has four readout electrodes, and
in each of the plurality of second pixels, the signal charges are read out from the photoelectric converter by two of the four readout electrodes in a first direction with respect to the row direction of the arrangement of the plurality of pixels, and the signal charges are read out from the photoelectric converter by the other two of the four readout electrodes in a second direction with respect to the row direction of the arrangement of the plurality of pixels, the second direction being opposite from the first direction.

6. The solid-state imaging device according to claim 1, wherein of two or more of the pixels arranged in the column direction and sharing at least one floating diffusion layer, pixel at one of one end and another end with respect to the column direction is a floating diffusion layer-including pixel.

7. The solid-state imaging device according to claim 2, wherein:
each of the plurality of first pixels further includes a second transfer electrode disposed adjacent to one of the plurality of first transfer electrodes with respect to the column direction, and an output control electrode disposed adjacent to the second transfer electrode with respect to the row direction of an arrangement of the plurality of pixels and that transfers the signal charge to the floating diffusion layer, and
the second transfer electrode transfers the signal charge in the column direction and the row direction.

8. The solid-state imaging device according to claim 2, wherein:
the floating diffusion layer-including pixels are arranged in rows in which a plurality of floating diffusion layers are arranged in an arrangement of the plurality of pixels,
in an exposure period within a single frame period, a potential of each of the plurality of first transfer electrodes that correspond to each other changes in the same manner for all of the plurality of pixels,
in a transfer period within the single frame period, potentials of mutually-corresponding ones of the plurality of first transfer electrodes change in the same manner in units of pixel groups, each of the pixel groups including the floating diffusion layer-including pixels arranged in a single one of the rows in which the floating diffusion layers are arranged and pixels sharing floating diffusion layers included in the floating diffusion layer-including pixels, and in a period when the potentials of the first transfer electrodes in one of the pixel groups are changing, the potentials of the first transfer electrodes in another of the pixel groups do not change.

9. An imaging device, comprising:

the solid-state imaging device according to claim 1;

a light source that emits infrared light in pulses at a plurality of timings in each of exposure periods within a single frame period; and a processor that generates a range image based on an output signal from the solid-state imaging device.

* * * * *